US010983341B2

(12) United States Patent
Geng et al.

(10) Patent No.: US 10,983,341 B2
(45) Date of Patent: *Apr. 20, 2021

(54) EYE TRACKING BASED ON POLARIZATION VOLUME GRATING

(71) Applicant: Facebook Technologies, LLC, Menlo Park, CA (US)

(72) Inventors: Ying Geng, Sammamish, WA (US); Babak Amirsolaimani, Redmond, WA (US); Scott Charles McEldowney, Redmond, WA (US); Wanli Chi, Sammamish, WA (US); Yusufu Njoni Bamaxam Sulai, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/808,355

(22) Filed: Mar. 3, 2020

(65) Prior Publication Data

US 2020/0201034 A1 Jun. 25, 2020

Related U.S. Application Data

(63) Continuation of application No. 16/226,553, filed on Dec. 19, 2018, now Pat. No. 10,634,907.

(51) Int. Cl.
G09G 5/00 (2006.01)
G02B 27/00 (2006.01)
G06F 3/01 (2006.01)
G02B 27/28 (2006.01)
G06T 7/70 (2017.01)

(52) U.S. Cl.
CPC ....... G02B 27/0093 (2013.01); G02B 27/283 (2013.01); G06F 3/013 (2013.01); G06T 7/70 (2017.01)

(58) Field of Classification Search
CPC ..... G06F 3/013; G06F 3/015; G02B 27/0093; G02B 27/0172; G02B 27/283; G02B 2027/0138; G06T 7/70; G06T 7/80
See application file for complete search history.

(56) References Cited

U.S. PATENT DOCUMENTS

| 10,311,584 | B1* | 6/2019 | Hall | G06T 7/251 |
| 10,488,921 | B1* | 11/2019 | Ouderkirk | G02B 27/141 |
| 10,634,907 | B1* | 4/2020 | Geng | G02B 27/283 |
| 2001/0043163 | A1* | 11/2001 | Waldern | G02B 27/0093 345/7 |
| 2004/0108971 | A1* | 6/2004 | Waldern | G02B 27/017 345/8 |

(Continued)

*Primary Examiner* — Joe H Cheng
(74) *Attorney, Agent, or Firm* — Morgan, Lewis & Bockius LLP

(57) ABSTRACT

An eye-tracker for determining a position of the pupil of an eye includes a detector and an optical element. The optical element is configured to receive first light reflected off the eye and reflectively diffract a portion of the first light that has a first polarization toward the detector. The optical element is also configured to transmit second light. The second light includes a second portion of the first light that has a second polarization that is different from the first polarization. A head-mounted display device that includes a display system and the eye-tracker is also disclosed. A method for determining the location of a pupil of an eye is also disclosed herein.

20 Claims, 16 Drawing Sheets

(56) References Cited

U.S. PATENT DOCUMENTS

| | | | |
|---|---|---|---|
| 2012/0194418 A1* | 8/2012 | Osterhout | G02B 27/0149 345/156 |
| 2014/0138544 A1* | 5/2014 | Sprague | G06F 3/013 250/341.8 |
| 2015/0035744 A1* | 2/2015 | Robbins | G02B 27/0172 345/156 |
| 2016/0091722 A1* | 3/2016 | Liu | G06F 3/013 345/8 |
| 2017/0154464 A1* | 6/2017 | Lanier | G02B 27/0172 |
| 2017/0358136 A1* | 12/2017 | Gollier | G06F 1/163 |
| 2018/0239146 A1* | 8/2018 | Bierhuizen | G02B 27/0093 |
| 2018/0239177 A1* | 8/2018 | Oh | G02F 1/13718 |
| 2018/0275409 A1* | 9/2018 | Gao | G02B 27/0179 |
| 2018/0275410 A1* | 9/2018 | Yeoh | H04N 13/344 |
| 2019/0086674 A1* | 3/2019 | Sinay | G02B 27/0093 |
| 2019/0219818 A1* | 7/2019 | Mattinson | G02B 27/0172 |
| 2019/0353898 A1* | 11/2019 | Amirsolaimani | G02B 6/42 |
| 2020/0192097 A1* | 6/2020 | Kim | G02B 27/0093 |
| 2020/0192280 A1* | 6/2020 | Kim | G02B 27/0172 |
| 2020/0192284 A1* | 6/2020 | Kim | G03H 1/0402 |
| 2020/0192285 A1* | 6/2020 | Kim | G02B 27/0093 |

* cited by examiner

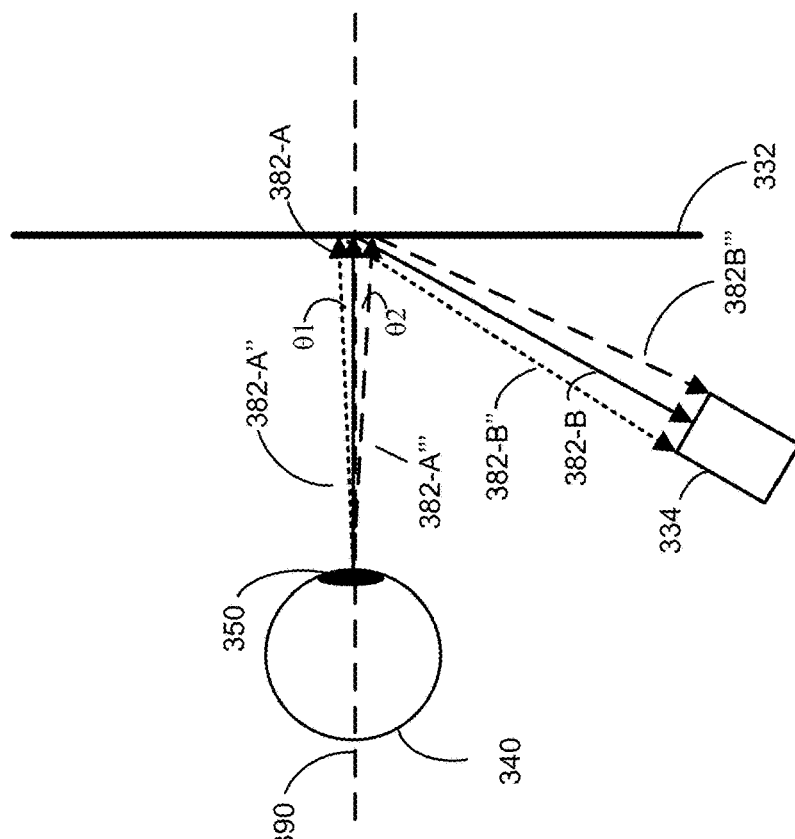
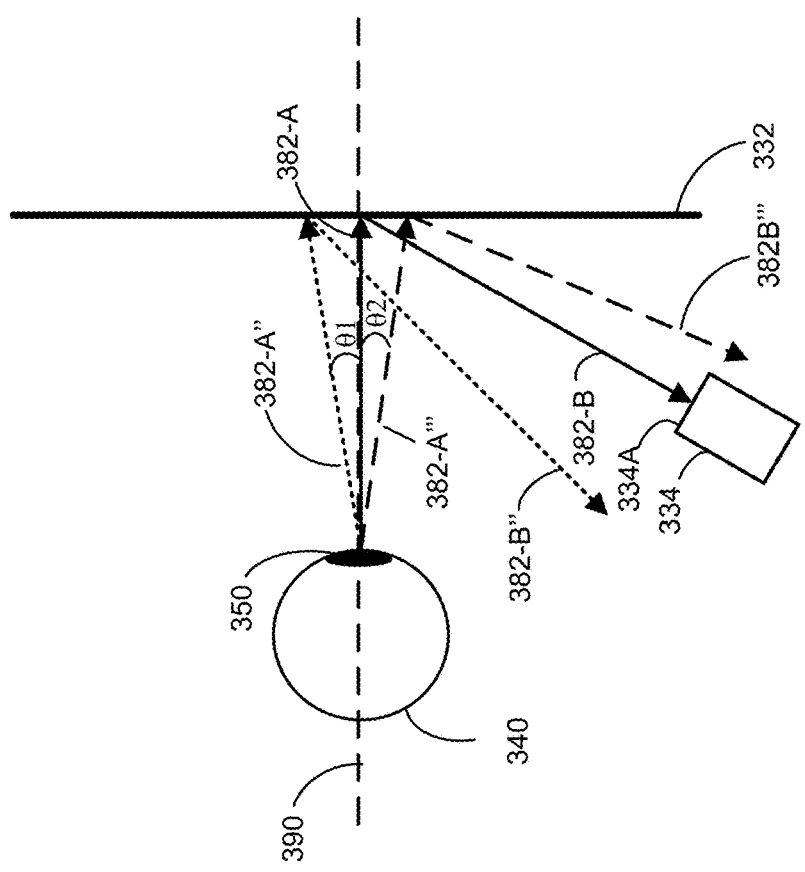

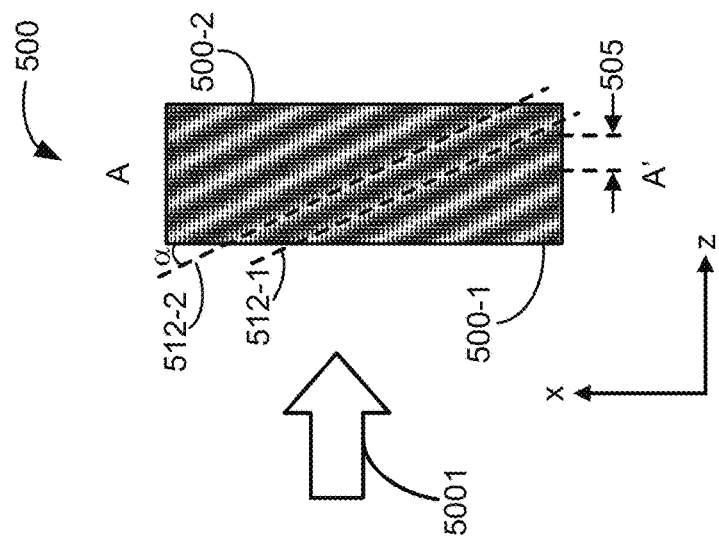
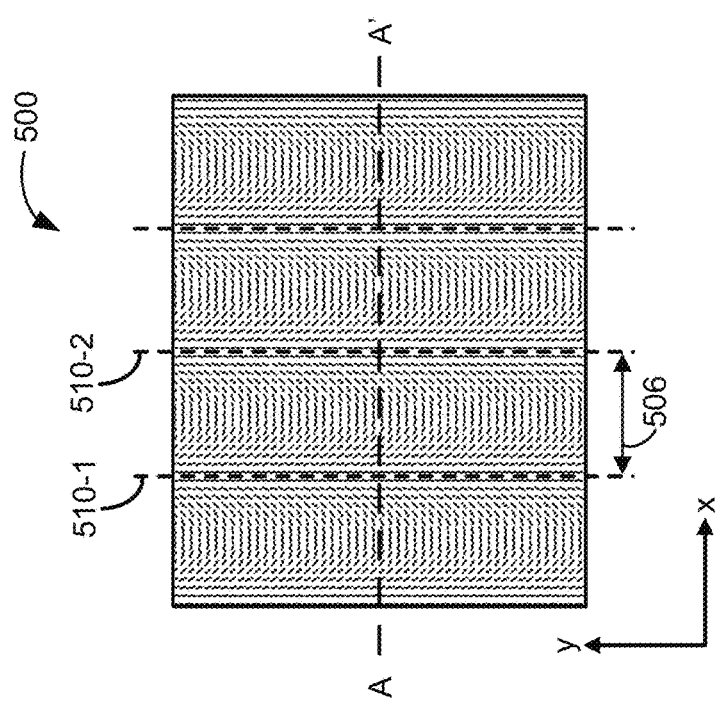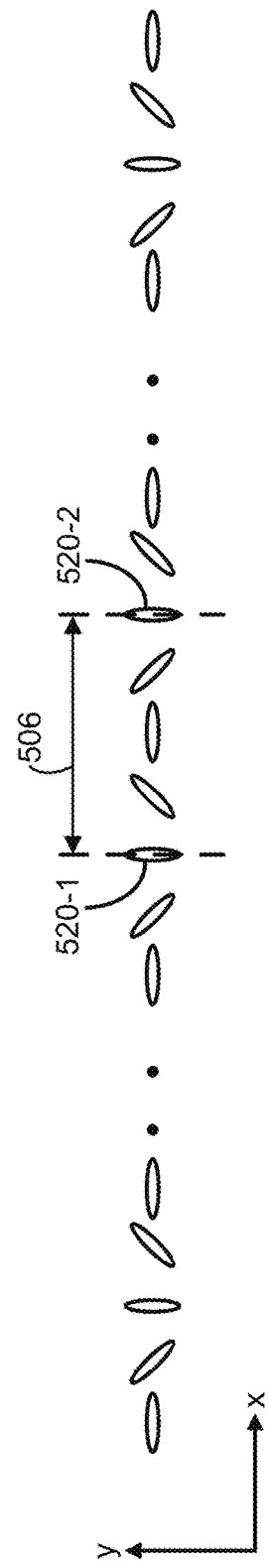
Figure 5C
Figure 5D
Figure 5E

EYE TRACKING BASED ON POLARIZATION VOLUME GRATING

RELATED APPLICATIONS

This application is a continuation application of U.S. patent application Ser. No. 16/226,553, entitled "Eye Tracking Based On Polarization Volume Grating," filed Dec. 19, 2018, now U.S. Pat. No. 10,634,907 B1, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, head-mounted display devices are used for virtual reality and augmented reality operations.

When operating head mounted displays, it can be desirable to track an eye of a user in order to direct images toward the user's eyes. In most cases, eye-tracking requires an illumination source to provide light for illuminating the eye and a camera or detector to receive light reflected off the eye. The placement of the illumination source and camera may be challenging since the components required for eye-tracking need to be located so that they do not obstruct a user's view of the display as well as be able to sufficiently illuminate the eye and receive light reflected at the eye.

SUMMARY

Accordingly, there is a need for a display having an eye-tracker that can sufficiently illuminate the eye and detect light reflected off the eye without obstructing a user's view of the displayed images. Further, it is desirable for the assembly to be light and compact as a bulky and/or heavy head-mounted display device may lead to user discomfort.

The above deficiencies and other problems associated with conventional head-mounted displays are reduced or eliminated by the disclosed display devices.

An eye-tracker, according to certain embodiments, is light-weight, compact, and includes a polarization volume hologram (also referred to herein as PVH) that allows for sufficient illumination of an eye and detection of light reflected off the eye without obstructing a user's view of the display. The PVH transmits light from a display so that the user can view images from the display. In some embodiments, the PVH also transmits eye-tracking light so that the eye-tracking light can be provided from an illumination source to the eye(s) of the user. The PVH redirects at least a portion of eye-tracking light that is reflected off the eye of the user to a camera or detector. Thus, the camera or detector does not need to be placed in front of the user's eyes and instead can be placed out of the way of the display, such as along a frame or outside the user's field of view. In some embodiments, the PVH can be placed in front of the display.

In accordance with some embodiments, an eye-tracker for determining a position of the pupil of an eye includes a detector and an optical element. The optical element has a first side facing the detector and an opposing second side. The optical element is configured to receive first light reflected off the eye on the first side and redirect a portion of the first light in a spectral range and a first circular polarization toward the detector. The optical element is also configured to transmit second light. The second light includes a second portion of the first light outside the spectral range and a third portion of the first light having a second circular polarization opposite to the first circular polarization.

In accordance with some embodiments, a head-mounted device configured to be mounted near an eye of a user includes a display system and an eye-tracker. The display system is configured to output image light corresponding to one or more images and to project the image light toward the eye. The eye-tracker includes a detector and an optical element. The optical element has a first side facing the detector and an opposing second side. The optical element is configured to receive first light reflected off the eye on the first side and redirect a portion of the first light in a spectral range and a first circular polarization toward the detector. The optical element is also configured to transmit a second portion of the first that is different from the first portion of the first light. The optical element is further configured to receive at least a portion of the image light on the second side and transmit the at least a portion of the image light toward the eye of the user.

In accordance with some embodiments, a method for determining a position of the pupil of an eye includes receiving first light reflected off the eye in a first direction, redirecting a first portion of the first light in a spectral range and first circular polarization as second light in a second direction such that the second light forms an obtuse angle with the first direction. The method also includes transmitting a second portion of the first light as third light in the first direction. The third light includes light outside the spectral range and light having a second circular polarization opposite to the first circular polarization. The method further includes forming an image of the eye using the second light and determining the position of the pupil of the eye based on the image.

Thus, the disclosed embodiments provide a light and compact eye-tracker that does not obstruct a user's view of the display.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 3C-3E illustrate light paths in an eye-tracking assembly in a display device in accordance with some embodiments.

FIGS. 5A-5E illustrate a polarization volume hologram in accordance with some embodiments.

Figure 1:
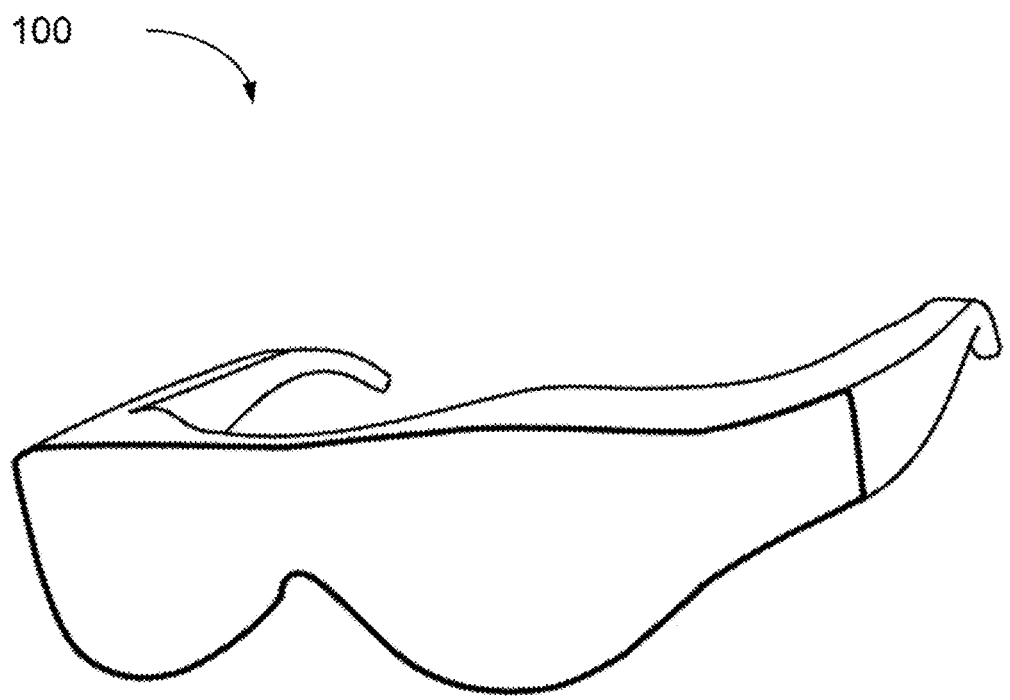
FIG. 1 is a perspective view of a display device in accordance with some embodiments.

These figures are not drawn to scale unless indicated otherwise.

DETAILED DESCRIPTION

The present disclosure provides an eye-tracker that includes a waveguide and a polarization volume hologram (PVH). The eye-tracker allows an eye to be sufficiently illuminated by eye-tracking light. The eye-tracker is configured to receive and redirect light reflected off the eye towards a detector or camera, allowing the detector or camera to be placed in a location that does not obstruct a user's view of the display. Further, the waveguide and PVH are configured to transmit light from a display to the eye(s) of the user, allowing the waveguide and PVH to be placed in front of the user's eyes without obstructing the user's view of the display. In some embodiments, a light source for providing eye-tracking light is also included. A head-mounted display device that includes a display system and the eye-tracker is disclosed herein. A method of determining a position of a pupil of an eye is also disclosed herein.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates a display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
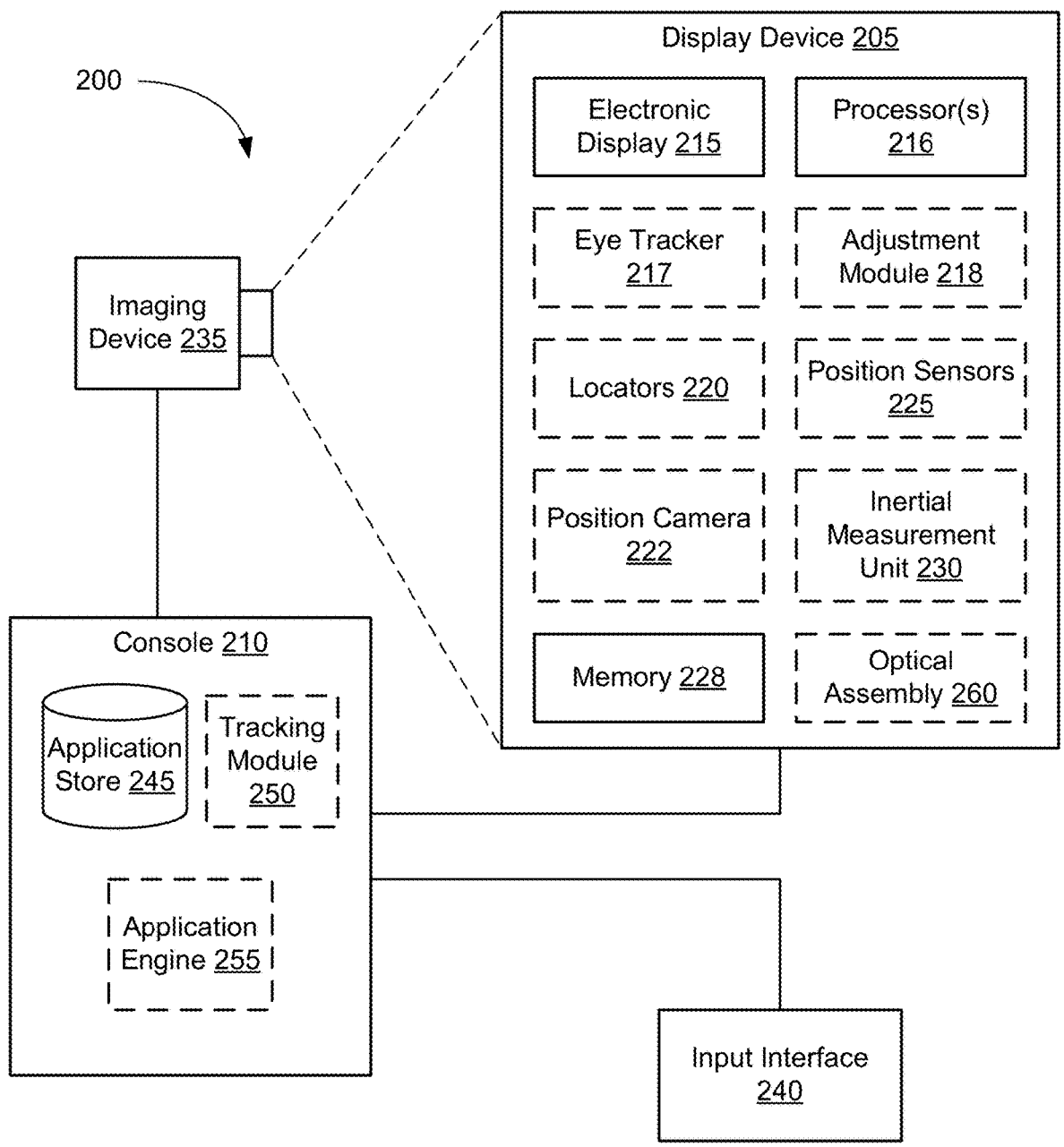
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox. An eyebox is a region that is occupied by an eye of a user of display device 205 (e.g., a user wearing display device 205) who is viewing images from display device 205. In some embodiments, the eyebox is represented as a 10 mm×10 mm square. In some embodiments, the one or more optical components include one or more coatings, such as anti-reflective coatings.

In some embodiments, electronic display 215 projects computer-generated images to one or more reflective elements (not shown), and the one or more optical assemblies 260 receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Eye tracking module 217 determines locations or gaze directions of each pupil of a user's eyes. Eye tracking module 217 may use a tracking lookup table to determine the pupil's locations for each eye. In some embodiments, the tracking lookup table is generated via a calibration procedure, which may include asking a user to look at various known reference points in an image and eye tracking module 217 and mapping the locations of the user's pupil while looking at the reference points to corresponding signals received on the IR tracking array.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof. In some embodiments, adjustment module may also be configured to adjust one or more optical components in the one or more optical assemblies 260 based on the gaze direction of the user's eyes, as detected by the eye-tracking module 217.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio).

Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260, which can include a single optical assembly 260 or multiple optical assemblies 260 (e.g., an optical assembly 260 for each eye of a user). In some embodiments, the one or more optical assemblies 260 receive image light for the computer generated images from the electronic display 215 and direct the image light toward an eye or eyes of a user. The computer-generated images include still images, animated images, and/or a combination thereof. The computer-generated images include objects that appear to be two-dimensional and/or three-dimensional objects.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
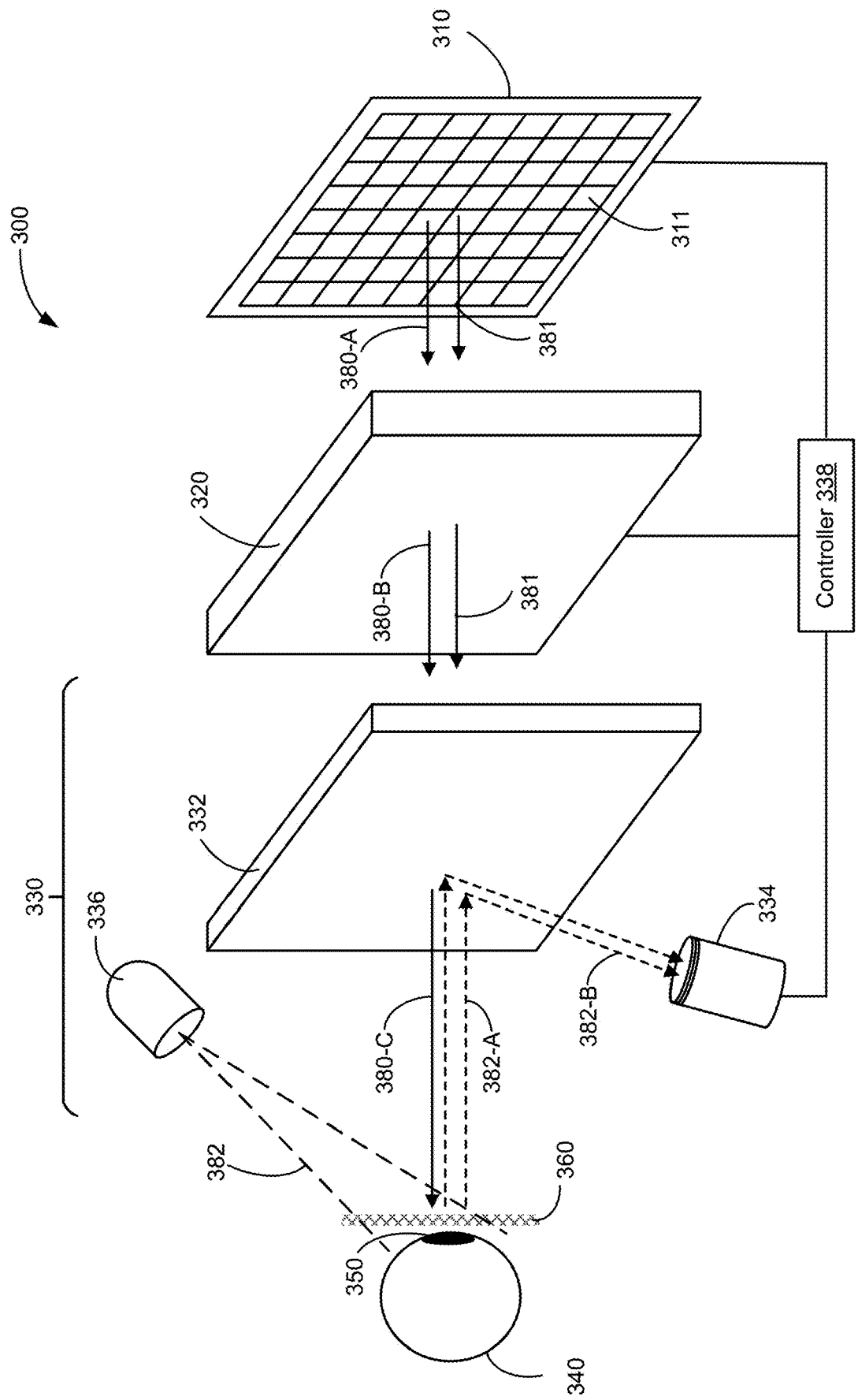
FIG. 3A is an isometric view of a display device in accordance with some embodiments.

FIG. 3A is an isometric view of display device 300 in accordance with some embodiments. In some other embodiments, display device 300 is part of some other electronic display (e.g., a digital microscope, a head-mounted display device, etc.). In some embodiments, display device 300 includes display 310 configured to emit image light 380-A, an optical assembly 320 including one or more lenses, and an eye-tracking assembly 330 including a first optical element 332, a detector 334 (e.g., one or more detectors and/or cameras), and an optional illumination source 336 for providing eye-tracking light 382. In some embodiments, the eye tracking assembly is coupled to a controller 338, which may include a processor (e.g., processor 216 or application engine 255) for processing the signals detected by the detector 334, and an adjustment module (e.g., adjustment module 218) configured to make adjustments to the display 310 and/or the optical assembly 320, as discussed above.

Display 310 (e.g., electronic display 215) emits image light toward the viewing user. In some embodiments, display 310 may also emit optional eye-tracking light 381 toward the viewing user. Display 310 includes an array of light emission devices 311 (e.g., LEDs, an array of microLEDs, an array of OLEDs, or some combination thereof) that emit visible light (e.g., light 380-A). Display 310 may optionally further include illumination devices that emit eye tracking light 381. In some embodiments, display device 300 includes one or more broadband sources (e.g., one or more white LEDs) coupled with a plurality of color filters, in addition to, or instead of, display 310.

Optical assembly 320 receives the image light (e.g., light 380-A) from display 310, and directs the image light to the eye 340 as light 380-B. In some embodiments, when the illumination devices are provided as part of the display 310, the optical assembly is further configured to transmit the eye tracking light toward the eye 340.

Illumination source 336 provides eye-tracking light 382, in addition to or in place of eye-tracking light 381. In some embodiments, the eye-tracking light 381 or 382 is in the IR or near-IR range. At least a portion of eye-tracking light 381 or 382 is then reflected off the eye 340 as light 382-A, which may include, for example, light retro-reflected from the retina of eye 340, a cornea of eye 340, a crystalline lens of eye 340, a sclera of the eye 340, or some combination thereof. First optical element 332 is configured to receive the light 382-A reflected off the eye 340 and redirect the light 382-A toward the detector 334 as light 382-B. Detector 334 is configured to receive light 382-B, which is used to determine a gaze direction of the eye 340. The detected gaze direction is then used to make adjustments to the display 310 and/or the optical assembly 320, as discussed above. First optical element 332 is also configured to transmit light 380-B from optical assembly 320 as light 380-C toward the eye 340.

In some embodiments, first optical element 332 includes a PVH optical element configured to redirect incident light (e.g., light 382-B) having certain properties without changing its polarization, and to transmitting light not having the certain properties (e.g., light 380-C) without changing its direction or polarization. The certain properties may include properties related to, for example, polarization, wavelength, and/or incident angle. For example, the PVH optical element can be configured to reflect right-circularly polarized (RCP) light in a certain spectral range, and to transmit all other light, including left-circularly polarized (LCP) light of any wavelength and RCP light that has a wavelength outside of the certain spectral range. Further, the PVH optical element may also have angular selectivity such that the certain properties also include an incident angle range for the RCP light in the certain spectral range. In some embodiments, the PVH optical element is configured to reflect incident light (e.g., light 382-A) when the incident light is within a certain angular range (e.g., 0-20 degrees) with respect to an optical axis of first optical element 332.

Additionally, a smaller angular range (e.g., 0-10 degrees) for the incident angle of the RCP light may be required in order for the redirected RCP light to pass through an aperture of detector 334 and be detected by detector 334. For example, a portion of light 382-A that is incident upon the PVH optical element at 15 degrees may be redirected by PVH optical element toward the general direction of the detector but does not make it through the aperture of the detector to be detected by detector 334. In contrast, another portion of light 382-A that is incident upon the PVH optical element at 7 degrees may be redirected by PVH optical element and detected by detector 334.

Figure 3B:
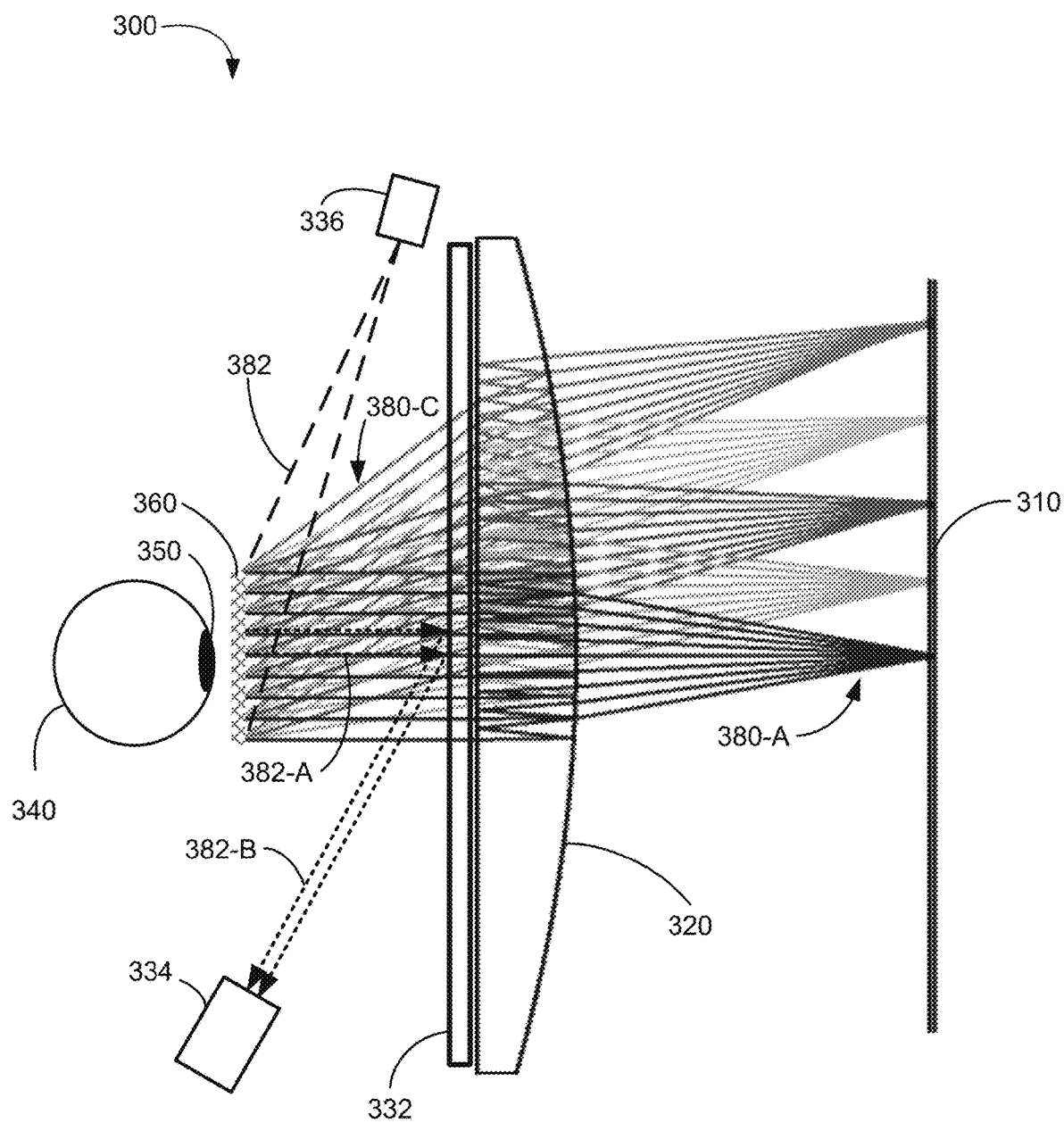
FIG. 3B illustrates a display device in accordance with some embodiments.

FIG. 3B illustrates display device 300 showing optical paths of image light 380-A emitted from display 310 and optical paths of eye-tracking light 382 from illumination source 336 in accordance with some embodiments. In some embodiments, as shown in FIG. 3B, eye-tracking assembly 330 includes first optical element 332, detector 334, and illumination source 336.

As shown in FIG. 3B, display 310 is configured to emit image light 380-A toward optical assembly 320. Optical assembly 320 is configured to receive image light 380-A and transmit the image light towards the eyes 340. In some embodiments, optical assembly 320 may include a microlens array or a pancake lens assembly configured to focus or direct the image light 380-A towards the eye 340. In some embodiments, when optical assembly 320 is a pancake lens assembly, as shown in FIG. 3B, the optical path of the image light includes at least one fold. In some embodiments, optical assembly 320 may include active features that can be dynamically adjusted by controller 338 (shown in FIG. 3A) based on a determination of the location of the user's eyes or gaze direction. Examples of such active features include a deformable mirror (e.g., microelectromechanical system device, galvanometer mirror), a deformable membrane, and an electro-optic component (e.g., spatial light modulator, liquid crystal lens or lens array).

First optical element 332 is configured to receive image light (e.g., image light 380-B shown in FIG. 3A) transmitted through optical assembly 320 and transmit the image light towards the eyes 340 as image light 380-C. For example, as shown in FIGS. 3A and 3B, image light 380-B output from optical assembly 320 is transmitted through first optical element 332 as image light 380-C. In this example, first optical element 332 is configured to interact with light in a certain spectral range (e.g., IR range, near-IR range) corresponding to eye-tracking light 382 (e.g., light having wavelength $\lambda_1$ that is inside the certain spectral range). Image light 380-B has wavelengths (e.g., wavelengths corresponding to visible light), $\lambda_2$, that are outside the certain spectral range. Thus, image light 380-B is transmitted through first optical element 332 (regardless of polarization and incident angle) as image light 380-C without change in the polarization or direction of image light 380-B.

Figure 3C:
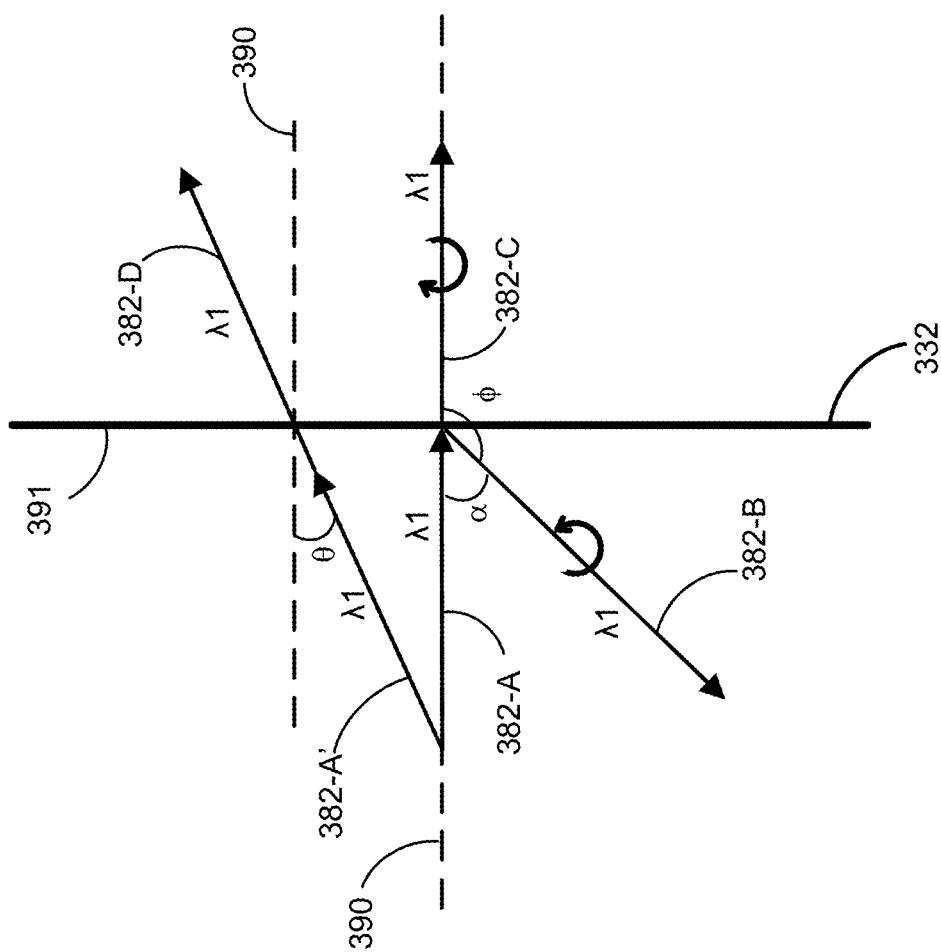

Referring to the optical path of eye-tracking light 382, shown in FIG. 3B, illumination source 336 is configured to illuminate the eye 340 of a user with eye-tracking light 382. At least a portion of eye-tracking light 382 is reflected off the eye 340 as light 382-A. First optical element 332 is configured to receive light 382-A reflected off the eye 340. First optical element 332 is also configured to redirect a portion of light 382-A as light 382-B toward the detector. For example, as shown in FIG. 3C, a first portion of light 382-A, incident upon first optical element 332 along an optical axis 390 parallel to a normal direction to a surface 391 of first optical element 332) and having a first circular polarization (e.g., RCP), is reflected by first optical element 332 in an off-axis direction as light 382-B without change in polarization (i.e., light 382-B also has the first circular polarization). In contrast, a second portion of light 382-A, different from the first portion, that has the second circular polarization (e.g., LCP) is transmitted through first optical element 332 as light 382-C without change in direction or polarization. In another example, as shown in FIG. 3C, light 382-A' incident upon first optical element 332 at an incident angle θ outside an accepted angular range for first optical element 332 is transmitted through first optical element 332, regardless of its polarization, as light 382-D without change in direction or polarization.

In some embodiments, the direction of light 382-B forms an angle α with the optical axis that can be larger than the incident angle of light 382-B. For example, light 382-B is shown in FIG. 3C as being substantially along the optical axis 390 and thus having a zero or very small (e.g., <10 degrees) incident angle, while the angle α can be much larger (e.g., ~20-80 degrees). In some embodiments, the direction of light 382-B forms an angle ϕ with the direction of light 382-A (or light 382C) that is larger than 90 degrees and smaller than 180 degrees minus the incident angle of light 382-A (e.g., 90 degrees<ϕ<180 degrees). In some embodiments, 100 degrees<ϕ<170 degrees. In further embodiments, 120 degrees<ϕ<150 degrees.

As shown in FIGS. 3D and 3E, detector 334 has an aperture 334A that can further limit the incident angle of light 382-A. In some embodiments, detector 334 is disposed at a position relative to first optical element 332 such that light 382-A with an incident angle of zero or near zero is redirected toward a center or near-center of aperture 334A. As shown in FIGS. 3D and 3E, light 382-A" has an incident angle θ1 within the accepted angular range for first optical element 332 and is thus redirected by first optical element as light 382-B". Light 382-B", however, may not necessarily make it through aperture 334A and be detected by detector 334, as shown in FIG. 3D. Likewise, light 382-A''' incident on first optical element 332 on a different side of the optical axis 390 from light 382-A", also has an incident angle θ2 within the accepted angular range for first optical element 332 and is thus redirected by first optical element as light 382-B''', but it may not necessarily make it through aperture 334A and be detected by detector 334.

In some embodiments, as shown in FIGS. 3D and 3E, for light reflected from eye 340 to make it through aperture 334A, the incident angle of the light may need to be within a smaller angler range (e.g., <10 degrees) than the accepted angular range for first optical element 332 (e.g., <20 degrees).

In some embodiments, as shown in FIG. 3B, optical assembly 320 may be located between display 310 and first optical element 332. In some embodiments, as shown in FIG. 3B, first optical element 332 may be adjacent to, in contact with, or attached to a surface of optical assembly 320. In some embodiments, first optical element 332 may include one or more thin films formed on a surface of optical assembly 320. spectral range.

Illumination source 336 is configured to illuminate the eye 340 with eye-tracking light 382, which is within the certain spectral range. Eye-tracking light 382 is reflected off the eye as light 382-A as described above.

Figure 4A:
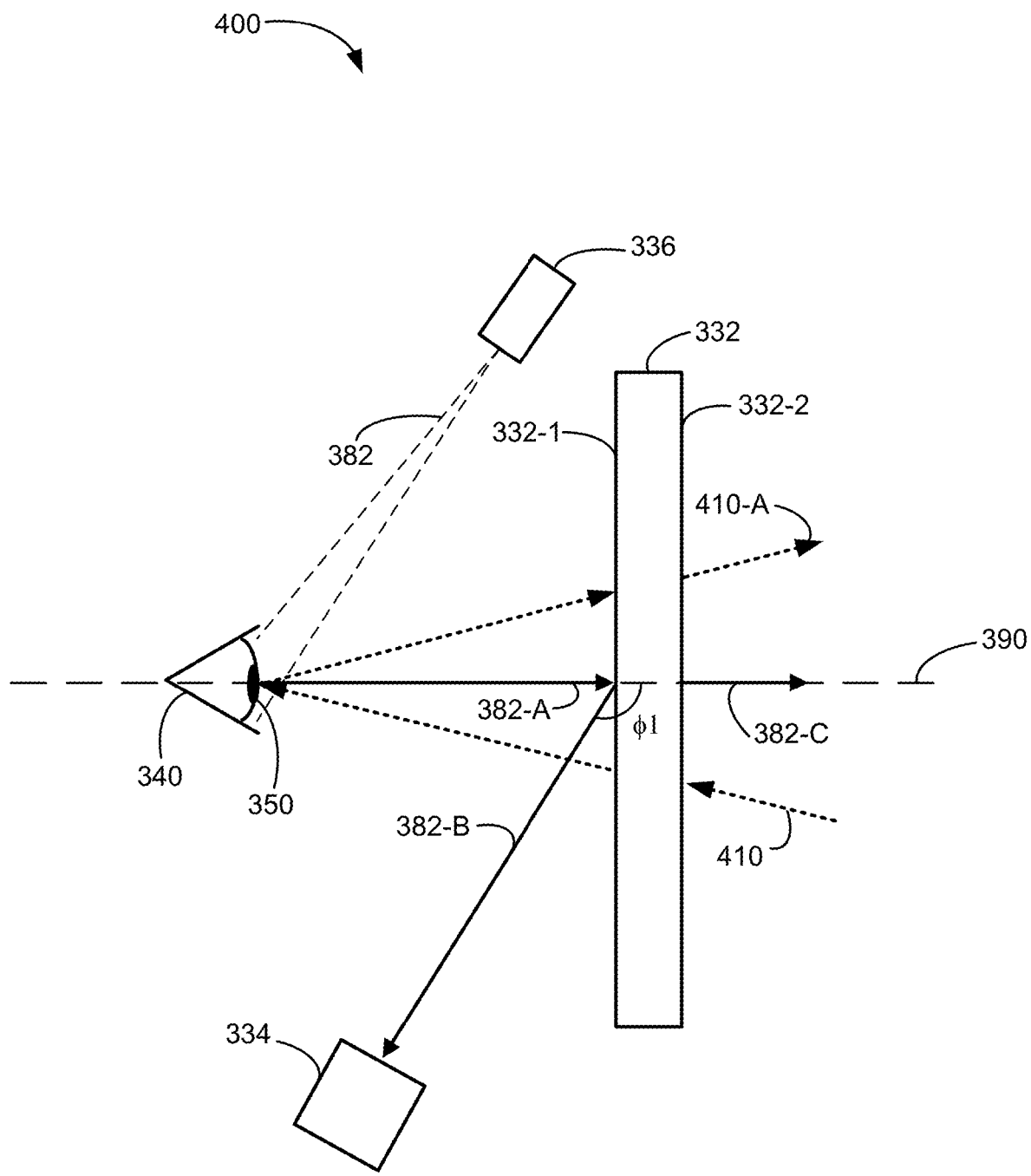
FIGS. 4A-4B illustrate the optical paths of light in an eye-tracking assembly in accordance with some embodiments.

FIG. 4A illustrates the optical paths of light in eye-tracking assembly 400 in accordance with some embodiments. First optical element 332 has a first surface facing the eye 340 and a second surface 332-2 opposite to the first surface 332-1 and facing display 310.

A portion of light 382-A is redirected (e.g., reflected, deflected, diffracted) by first optical element 332 towards detector 334 in an off-axis direction that forms an angle ϕ1 with the direction of light 382-A incident on first optical element 332, as described above with respect to FIGS. 3B, 3C, and 3D. Detector 334 is configured to receive light 382-B, which is used to determine the position of the pupil 350 of the eye or the gaze direction of the eye 340. In some embodiments, light 382-A is incident upon first optical element in a direction that is substantially along an optical axis 390 of first optical element (e.g., light 382-A forms an angle with optical axis 390 that is less than 10 degrees). In certain embodiments, ϕ1 is larger than 90 degrees and smaller than 180 degrees.

Light 410 may include image light (e.g., light 380-A or 380-B) emitted from a display (e.g., display 310). Light 410 may also include, in augmented-reality applications, ambient light from outside the display device (e.g., display device 300). First optical element 332 is configured to transmit light 410 without changing the polarization or direction of light 410. In some embodiments, at least a portion of light 410 reaches the eye 340 and is reflected off the eye 340 as light 410-A, which may include, for example, light 410 retro-reflected from the retina of eye 340, a cornea of eye 340, a crystalline lens of eye 340, or some combination thereof. First optical element 332 is configured to receive light 410-A and to transmit light 410-A, regardless of its polarization or incident angle, without changing the direction or polarization of light 410-A. Light 410-A may include light substantially parallel to optical axis 390, which is parallel to a normal to a surface (e.g., surface 332-1 or 332-2) of first optical element 332, as well as off-axis light that is not substantially parallel to optical axis 390.

Figure 4B:
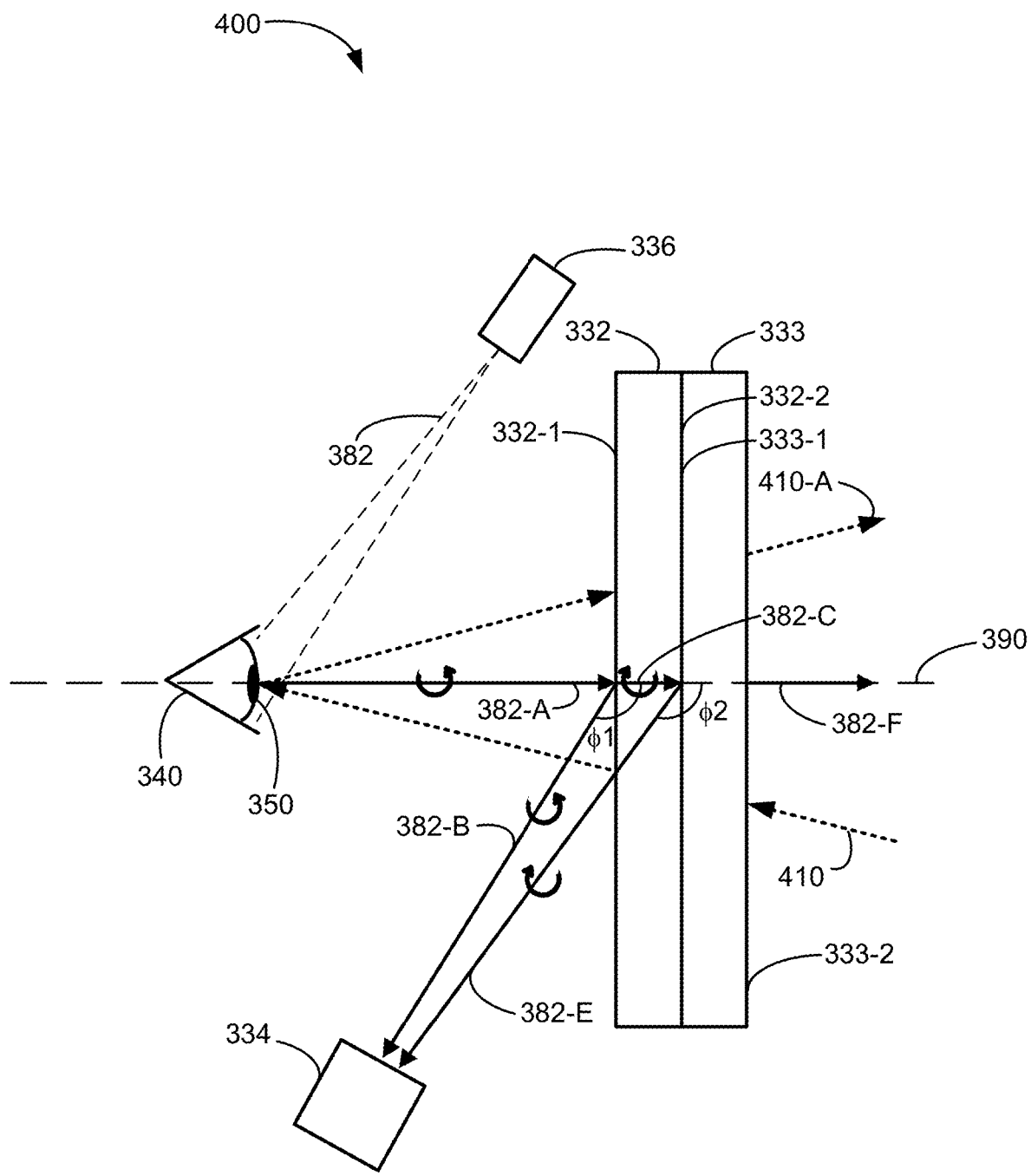

Referring to FIG. 4B, eye-tracking assembly may include a second optical element 333. Second optical element 333 has a first surface facing the eye 340, and a second surface 333-2 opposite to the first surface 333-1 and facing display 310.

In some embodiments, as shown in FIG. 4B, first surface 333-1 of second optical element 333 is adjacent to (e.g., touching, located on, facing, attached to, or next to) second surface 332-2 of first optical element 332 such that first optical element 332 is located between second optical element 333 and eye 340. Alternatively, second surface 333-2 of second optical element may be adjacent to (e.g., touching, located on, facing, attached to, or next to) first surface 332-1 of first optical element 332 such that second optical element 333 is located between first optical element 332 and eye 340. Thus, the respective positions of first optical element 332 and second optical element 333 are interchangeable.

In some embodiments, second optical element 333 is configured to transmit light 410 as described above with respect to first optical element 332 in FIG. 4A, and the description regarding this function is not repeated here for brevity. In some embodiments, second optical element 333 includes a PVH optical element.

In some embodiments, first optical element 332 is configured to redirect (e.g., reflect, refract, diffract) light in the certain spectral range and having a first circular polarization, and second optical element 333 is configured to redirect (e.g., reflect, refract, diffract, focus) light in the certain spectral range and having a second circular polarization different from (e.g., opposite to) the first circular polarization. For example, as shown in FIG. 4B, light 382-A is reflected off the eye 340 and is incident on first surface 332-1 of first optical element 332. A portion of light 382-A in the certain spectral range and having a first circular polarization (e.g., RCP) is redirected (e.g., reflected, deflected, diffracted) by first optical element 332 towards detector 334 as light 382-B having the first circular polarization (e.g., RCP), described above with respect to FIGS. 3B and 3C. A remaining portion of light 382-A is transmitted from the first surface 332-1 to the second surface 332-2 of first optical element 332 (e.g., transmitted through first optical element 332) as light 382-C and is incident on the first surface 333-1 of second optical element 333. A portion of light 382-C that is in the certain spectral range and has a second circular polarization (e.g., LCP) different from the first circular polarization is redirected by (e.g., reflected, deflected, diffracted) by second optical element 333 towards detector 334 as light 382-E having the second circular polarization (e.g., LCP). Light 382-E is redirected by second optical element 333 in an off-axis direction that forms an angle φ2 with the direction of light 382-C incident on second optical element 333. A portion of light 382-C that is not redirected by second optical element 333 is transmitted through second optical element 333 as light 382-F. For example, light 382-F may include light outside of the certain spectral range.

By including second optical element 333 in addition to first optical element 332, the efficiency of eye-tracker 400 in detecting light reflected off eye 340 is increased because detector 334 receives not only a portion of light 382-A having the first circular polarization (e.g., RCP), but also a portion of light 382-A having the second circular polarization (e.g., LCP).

Figure 4C:
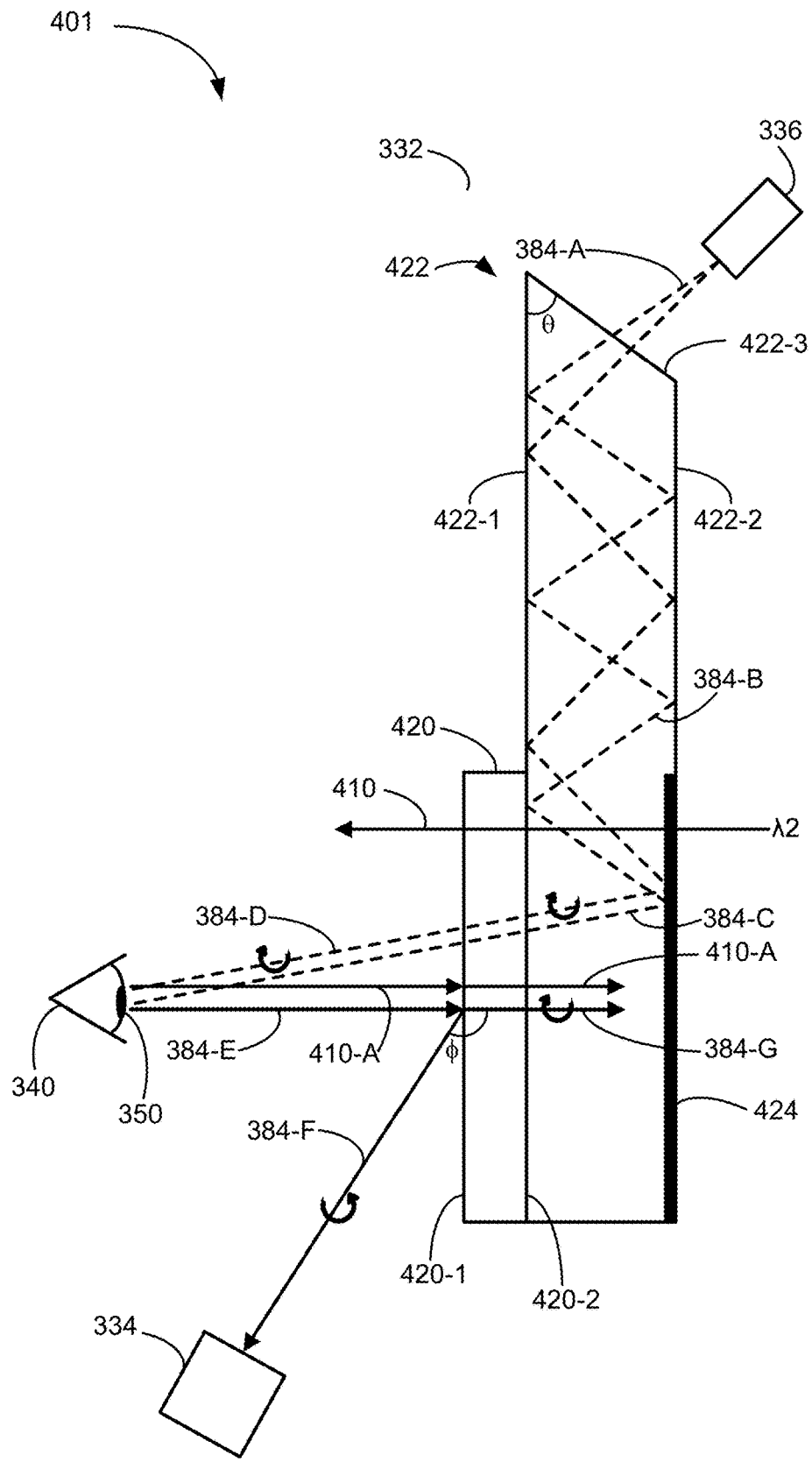
FIGS. 4C-4D illustrate an eye-tracking assembly in accordance with some embodiments.

FIG. 4C illustrates an eye-tracking assembly 401 corresponding to eye-tracking assembly 330 in accordance with some embodiments. Eye-tracking assembly 401 includes first optical element 332, detector 334, and illumination source 336. In some embodiments, as shown in FIG. 4C, first optical element 332 includes a PVH optical element 420, an optical waveguide 422, and an output coupler 424.

Optical waveguide 422 has a first side 422-1 facing the detector 334, a second side 422-2 opposite to the first side 422-1 and facing display 310, and a third side 422-3 facing the illumination source 336. In some embodiments, a surface on the third side 422-3 is neither parallel nor perpendicular to the surface on the first side 422-1 or second side 422-2. In other words, that the surface on the third side 422-3 forms an angle φ with the surface on the first side 422-1 that is between 0 and 90 degrees (e.g., 30-60 degrees). In some embodiments, output coupler 424 is located near the first side 422-1 or the second side 422-2 of optical waveguide 422. In some embodiments, output coupler 424 may be adjacent to or located on (e.g., coupled to, in contact with attached to) an inside surface on the first side 422-1 or the second side 422-2 of optical waveguide 422. In some embodiments, output coupler 424 may include one or more thin films formed on an inside surface on the first side 422-1 or the second side 422-2 of optical waveguide 422.

PVH 420 has a first surface 420-1 facing the detector 334 and a second surface 420-2 opposite to the first surface 420-1 and facing display 310. In some embodiments, the second surface 420-2 of first optical element 332 faces the first side 422-1 of optical waveguide 422. In some embodiments, first optical element 332 may be adjacent to or located on (e.g., coupled to, in contact with attached to) the first side 422-1 of optical waveguide 422. In some embodiments, PVH 420 may be includes one or more thin films formed on a portion of an outside surface on the first side 422-1 of optical waveguide 422. In some embodiments, an output surface of illumination source 336 (e.g., surface of illumination source 336 from which eye-tracking light 384-A is output) is coupled to the surface on the third side 422-3 of optical waveguide 422, and optical waveguide 422 is configured to receive eye-tracking light 384-A output from illumination source 436 on the third side 422-3.

Illumination source 436 is configured to provide eye-tracking light 484-A, which is coupled into optical waveguide 422 at the third side 422-3 of optical waveguide 422 as light 384-B. Light 384-B propagates along optical waveguide 422 via total internal reflection until light 384-B is incident on the output coupler 424. In certain embodiments, at least a portion of light 384-A propagates in a direction substantially perpendicular to a receiving surface of the waveguide on the third side 422-3.

Output coupler 424 is configured to redirect light 384-B as light 384-C so that light 384-C impinges on an inside surface on the first side 422-1 of optical waveguide 422 at an angle that does not meet the conditions for total internal reflection (e.g., light 384-C impinges the first side 422-1 of optical waveguide 422 at an angle that is less than a critical angle for total reflection associated with the waveguide 422). Thus, light 484-C, redirected by output coupler 424, exits optical waveguide 422 on the first side 422-1 and is directed toward the eye 340. In some embodiments, as shown, a portion of light 484-C having a second circular polarization is transmitted through first optical element 332 toward the eye 340 as light 384-D without a change in direction or polarization. In some embodiments, not shown, light 384-C is directed to the eye 340 as light 384-D and is not transmitted through PVH optical element 420. In this case, light 384-C is not filtered through PVH optical element 420. In some embodiments, output coupler 424 is a Bragg grating or Bragg reflector configured to redirect (e.g., diffract) light 384-B as light 384-C to be output from waveguide 422. In the case where output coupler 424 is located near the second side 422-2 of optical waveguide 422, as shown in FIG. 4C, the output coupler is a Bragg reflector. In the case where output coupler 424 is located near the first side 422-1 of optical waveguide 422 (not shown) the output coupler is a Bragg grating.

The optical path of light reflected from the eye 340 of the user is shown in FIG. 4C. Eye-tracking light 384-D is reflected off the eye 340 as light 384-E. Light 384-E corresponds to light 382-A, light 384-F corresponds to light 382-B, and light 384-G corresponds to light 382-C as described above with respect to FIG. 4A. Thus, details of light 384-E, light 384-F, and light 384-G follow the details of light 382-A, light 382-B, and light 382-C, respectively, and will not be repeated here for brevity. In some embodiments, light 384-G may be transmitted through optical waveguide 422 and/or output coupler 424.

In some embodiments, waveguide 422 is configured to allow image light and/or ambient light to reach the eye 340. Thus, light 410 and light 410-A are transmitted through optical waveguide 422 and/or output coupler 424. Further details regarding light 410 and light 410-A are described above with respect to FIG. 4A and are not repeated here for brevity.

Figure 4D:
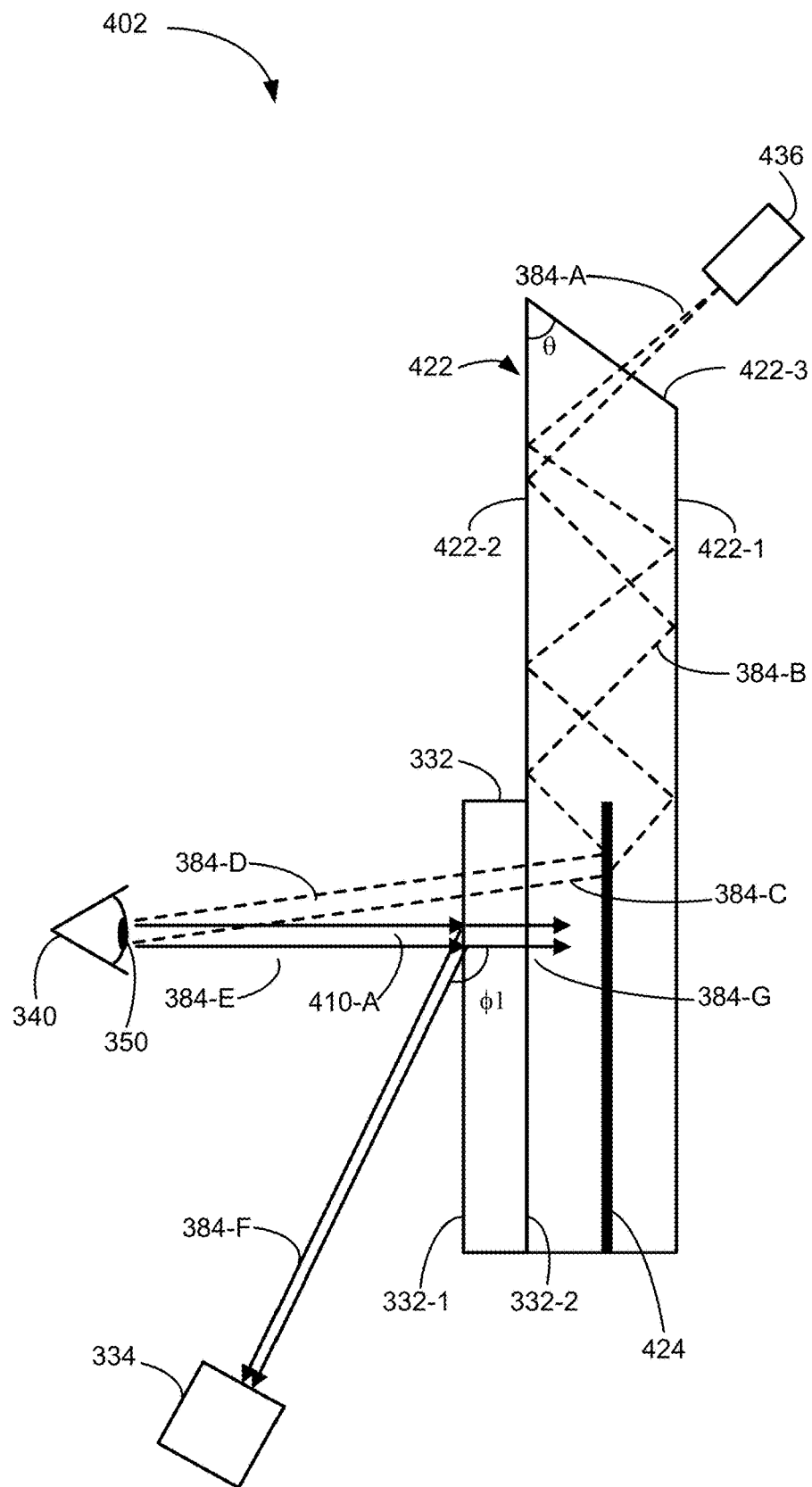

FIG. 4D illustrates an eye-tracking assembly 402 with an optical waveguide 422 in accordance with some embodiments. Most of the features in eye-tracking assembly 402 are the same as or similar to corresponding features in eye-tracking assembly 401 and are thus not described here again for sake of brevity. FIG. 4D shows that output coupler 424 may be placed inside optical waveguide 422. In some embodiments, output coupler 424 is located at an interface between a core and a cladding layer of optical waveguide 422. As shown in FIG. 4D, output coupler 424 may be a Bragg reflector and/or a Bragg grating.

Figure 4E:
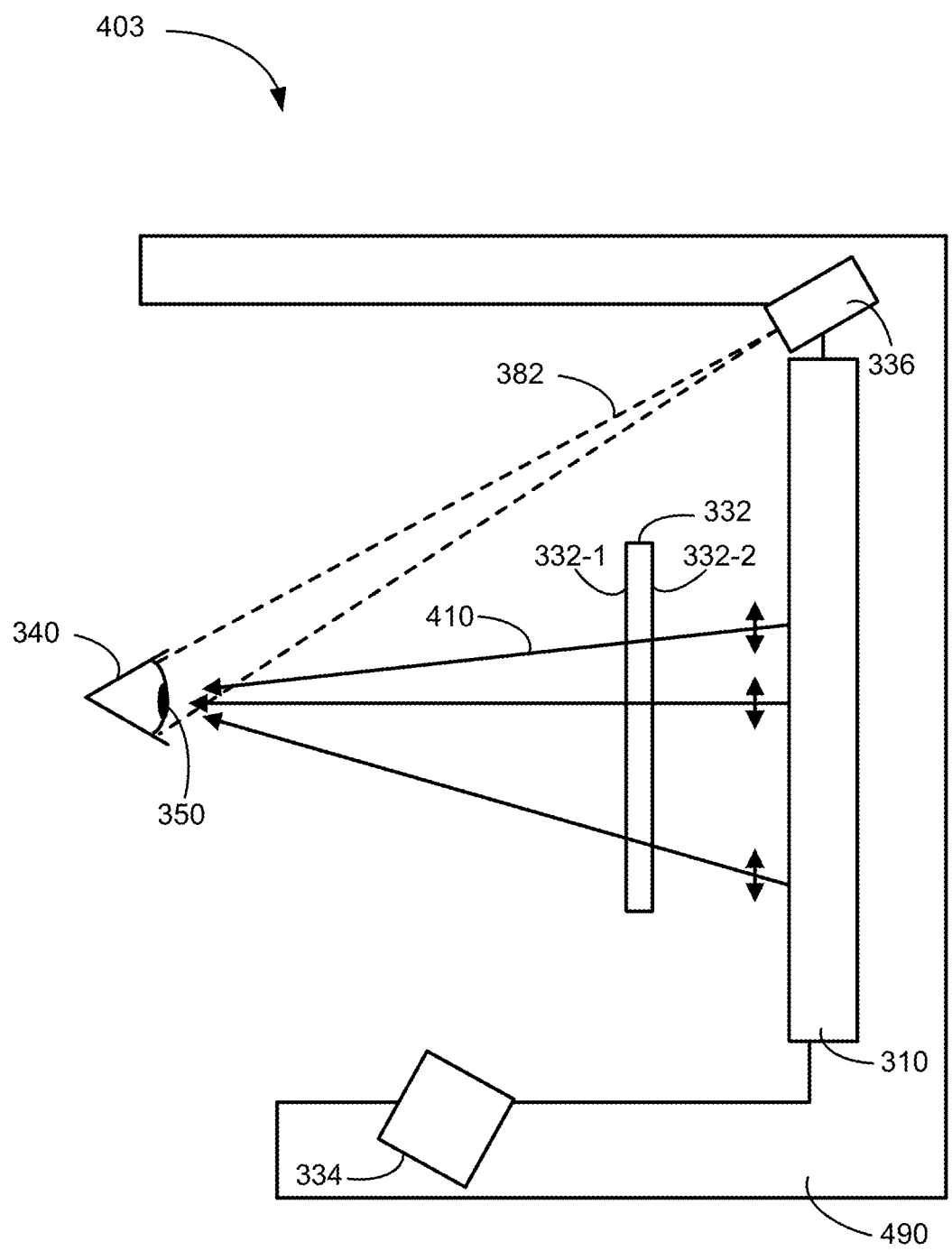
FIG. 4E illustrates a an eye-tracking assembly in a display device in accordance with some embodiments.

FIG. 4E illustrates an eye-tracking assembly 400 in display device 403 in accordance with some embodiments. Display device 403, corresponding to display devices 100, 205, and 300, includes a frame 490, display 310, and an eye-tracker assembly. The eye-tracker assembly includes illumination source 336, one or more optical elements (e.g., first optical element 332, second optical element 333), and detector 334. In some embodiments, as shown, one or more of display 310, illumination source 336, and detector 334 are located on (e.g., touching, proximate to, adjacent to, mounted on, embedded in, suspended from) frame 490. Although display device 403 is shown with eye-tracking assembly 400, it is understood that eye-tracking assemblies 401 and 402 can be included in display device 403 in place of eye-tracking assembly 400.

As shown in FIG. 4E, light 410, having a first linear polarization, is output from display 310 and is transmitted through first optical element 332 towards the user's eye 340. In some embodiments, when second optical element 333 is included in the eye-tracker assembly, second optical element 333 is also configured to transmit light 410 so that light 410 may reach the eye 340.

In some embodiments, display device 403 is a head-mounted display device.

Thus, in accordance with some embodiments, an eye-tracker (e.g., eye-tracking assembly 330, 400) for determining a position of the pupil of an eye includes an optical element (e.g., first optical element 332) and a detector (e.g., detector 334). The first optical element has a first side facing the detector and a second side opposing the first side. The first optical element is configured to receive first light (e.g., light 382-A and/or light 410-A) reflected off the eye on the first side. The first optical element is also configured to redirect a first portion (e.g., 382-B) of the first light toward the detector. The first portion of the first light is in a spectral range (e.g., the certain spectral range, IR range, near-IR range) and has a first circular polarization. The first optical element is further configured to transmit second light.

The second light includes a second portion (e.g., light 410-A) of the first light outside the spectral range (e.g., visible light reflected from the eye 340) and a third portion (e.g., light 382-C) of the first light having a second circular polarization. The second light is different from the first light. In some embodiments, the second light includes light incident on one of the first side and the second side of the first optical element that is different from the first portion of the first light (e.g., visible light reflected off the eye or visible light projected towards the eye from a display/emission surface such as light 410). In some embodiments, the second light includes light (e.g., light 382-C, diffuse reflection of NIR light from the eye) in the spectral range and with a polarization different from the first circular polarization. In some embodiments, the second light includes light (e.g., light 410-A) outside the spectral range. In some embodiments, the first optical element is configured to redirect a first portion of the first light toward the detector without changing the polarization of the first portion of the first light.

In some embodiments, the detector (e.g., detector 334) is disposed off-axis with respect to an optical axis of the first optical element (e.g., first optical element 332), meaning that the detector 334 is positioned to receive light redirected (e.g., diffracted, reflected, refracted) from first optical element having a direction of propagation that is not substantially parallel to the optical axis. In some embodiments, the direction of propagation forms an angle with the optical axis that is large enough (e.g., >30 degrees) to allow the detector to be placed away from the optical paths of the image light (e.g., light 410) between first optical element 332 or optical assembly 320 and the eye 340. The first optical element is further configured to receive the first light (e.g., light 382-A) in a first direction. In some embodiments, the first direction is substantially along (e.g., substantially parallel to, forms an angle no greater than 10 degrees with) the optical axis of first optical element 332 (i.e., in some cases, the first light has an incident angle that is no greater than 10 degrees), and to redirect the first portion (e.g., light 382-B) of the first light in a second direction toward the detector. The first optical element is further configured to redirect the first portion of the first light in a second direction toward the director. The second direction forms an angle with the first direction that is greater 90 degrees and less than 180 degrees minus the incident angle.

In some embodiments, the eye-tracker (e.g., eye-tracking assembly 330, 400) also includes a second optical element (e.g., second optical element 333). The second optical element has a first side (e.g., first side 333-1) and a second side (e.g., second side 333-2) opposite the first side. The first side of the second optical element is adjacent to (e.g., connected to, touching) and faces the second side of the first optical element (e.g., first side 333-1 of the second optical element 333 is adjacent to and faces the second side 332-2 of the first optical element 332). The second optical element is configured to receive the second portion (e.g., light 410-A) of the first light and the third portion (e.g., light 382-C) of the first light on the first side of the second optical element. The second light includes light outside the spectral range and light having a second circular polarization opposite to the first circular polarization. The second optical element is also configured to redirect the third portion of the first light toward the detector (e.g., detector 334) and transmit the second portion of the first light to the second side of the second optical element.

In some embodiments, the second light includes light (e.g., light 410-A) having wavelength(s) (e.g., wavelength $\lambda_2$) that is in the visible light wavelength range and outside the spectral range. The second light also includes light (e.g., light 482-C) having wavelength(s) outside the spectral range and/or polarization different from the first circular polarization.

In some embodiments, the second light includes third light (e.g., light 410 and/or eye-tracking light 381, 382, 384-A) from one or more light sources (e.g., display 310 and/or ambient light) and the first optical element (e.g., first optical element 332) is configured to receive the third light on the second side (e.g., second side 332-2) and to transmit the third light towards the eye. In some embodiments, the third light includes light that illuminates the eye for eye-tracking applications and/or light from a display.

In some embodiments, the first light includes a portion of the third light (e.g., light 410 and/or eye-tracking light 381, 382, 384-A).

In some embodiments, the first light includes a portion of the third light (e.g., light 410-A and/or light 382-A, light 384-E) that is reflected off the eye.

In some embodiments, the one or more light sources includes an illumination source (e.g., illumination source 336) and the third light includes fourth light (e.g., light 384-A) from the illumination source. The eye-tracker (e.g., eye-tracking assembly 401, 402) includes a waveguide (e.g., optical waveguide 422) coupled to the first optical element (e.g., first optical element 332). The waveguide is configured to receive the fourth light at a third direction and to redirect at least a portion of the fourth light in a fourth direction toward the second side of the first optical element (e.g., optical waveguide 422 is configured to receive light 384-A and redirect light 384-A toward the second side 332-2 of the first optical element 332 as light 384-C). The fourth direction forms a smaller angle with an optical axis (e.g., optical axis 390) of the first optical element than the third direction.

In some embodiments, the waveguide (e.g., optical waveguide 422) includes a Bragg reflector (e.g., output coupler 424) configured to redirect (e.g., reflect or diffract) the at least a portion of the fourth light. In some embodiments, the waveguide includes a Bragg grating (e.g., output coupler 424) configured to redirect (e.g., diffract) the at least a portion of the fourth light.

In some embodiments, the Bragg reflector (e.g., output coupler 424) is a multiplexed Bragg reflector. The Bragg reflector is configured to redirect (e.g., reflect or diffract) light having a wavelength within the certain spectral range and transmit light having a wavelength outside the certain spectral range. In some embodiments, the Bragg reflector is configured to redirect light towards the eye.

In some embodiments, the waveguide is disposed adjacent to the second side of the first optical element (e.g., optical waveguide 422 is located adjacent to the second surface 332-2 of first optical element 332).

In some embodiments, the first light includes fifth light reflected from a first location (e.g., pupil 350) of the surface of the eye (e.g., eye 340) and sixth light reflected from a second location (e.g., cornea) of the surface of the eye. The detector (e.g., detector 334) is configured to detect a first intensity of a redirected portion of the fifth light and a second intensity of a redirected portion of the sixth light; and determine, based on the first intensity and the second intensity, the position of the pupil of the eye.

FIGS. 5A-5E illustrate PVH optical element 500 in first optical element 332 described above with respect to FIGS. 3A-4D, in accordance with some embodiments.

In some embodiments, PVH optical element 500 includes a layer of liquid crystals arranged in helical structures (e.g., a liquid crystal formed of a cholesteric liquid crystal). PVH optical element 500 is polarization selective with respect to circular polarization of light. When the circularly polarized light has a handedness that corresponds to (e.g., is along or has the same handedness as) the helical twist of liquid crystal structures along their helical axis in PVH optical element 500, PVH optical element 500 interacts with the circularly polarized light, resulting in change of the direction of propagation of the light (e.g., reflect, refract, or diffract the light). In some embodiments, the polarization of the light is also changed to an opposite polarization (e.g., to a circular polarization having the opposite handedness). In contrast, PVH optical element 500 will transmit light that has a circular polarization with opposite handedness to the helical twist of liquid crystal structures in PVH optical element 500 without changing its direction or polarization. PVH optical element 500 can be a transmissive PVH optical element or a reflective PVH optical element. As a transmissive PVH optical element, PVH optical element 500 can be configured to transmit light having certain properties while changing its direction and polarization while transmitting light not having the certain properties without changing its direction or polarization. The certain properties may include, for example, polarization, wavelength, and/or incident angle. As a reflective PVH optical element, PVH optical element 500 can be configured to redirect light having certain properties without changing its polarization while light not having the certain properties is transmitted through the PVH optical element 500 without having its polarization changed.

For example, a transmissive PVH optical element can have right-handed liquid crystal helical structures and can be configured to change the polarization of RCP light impinged thereon to LCP light while simultaneously redirects (e.g., refracts, diffracts) the RCP light. On the other hand, such a transmissive PVH optical element would transmit LCP light impinged thereon without changing its polarization or direction. In another example, a reflective PVH optical element can have right-handed liquid crystal helical structures and can be configured to redirect (e.g., reflect, refract, diffract) RCP light impinged thereon without changing the polarization of the RCP light while transmitting LCP light impinged thereon without changing its polarization or direction. In addition to polarization selectivity, PVH optical element 500 may also have wavelength selectivity. For example, a right-handed reflective PVH optical element is configured to reflect RCP light within a certain spectral range and to transmit all other light, including LCP light within the certain spectral range and RCP light that has a wavelength outside of the certain spectral range. Further, PVH optical elements may also be configured to have angular selectivity such that the PVH interacts with light that is incident upon a surface of the PVH optical element within a certain angular range (e.g., substantially parallel to an optical axis of the PVH optical element, in some cases, the incident light and an optical axis of the PVH optical element form an angle that is less than 20 degrees) and satisfies the polarization and wavelength conditions as described above. Light that is incident on the surface of the PVH optical element at an angle that is outside the certain angular range would be transmitted through the PVH optical element with no change in polarization or direction. PVH optical element 500 is described in further detail below with respect to FIGS. 5A-5F.

Figures 5A, 5B:
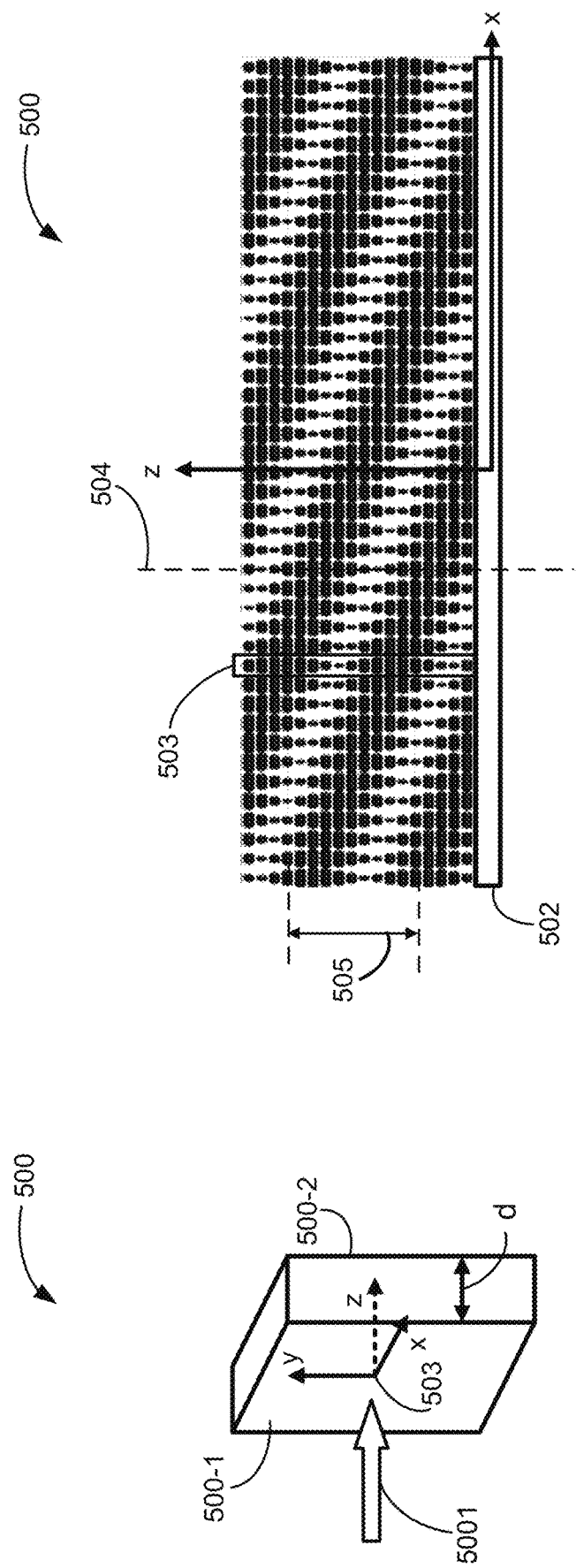

FIG. 5A illustrates a three dimensional view of PVH optical element 500 with incoming light 5001 impinging the lens along the z-axis. PVH optical element 500 has two opposing optical surfaces 500-1 and 500-2. In some embodiments, the optical surfaces 500-1 and 500-2 are substantially flat. PVH optical element 500 has thickness, d, along the z-axis.

FIG. 5B illustrates an x-z cross-sectional view of PVH optical element 500. In some embodiments, PVH optical element 500 includes photoalignment layer 502 (e.g., a layer including organic or inorganic compounds including photosensitive groups) and helical structures 503 formed of optically anisotropic molecules. Photoalignment layer 502 is formed by adding a layer of photoalignment material (PAM) on one of the optical surfaces 500-1 and 500-2. The PAM layer is then exposed to an alignment light (e.g., linearly polarized light) with a desired intensity and incident angle. The alignment light is gradually scanned over the layer of PAM while rotating polarization of the alignment light. The alignment light creates a cycloidal pattern on the layer of PAM (e.g., cycloidal patterns are explained below with respect to FIG. 5E). After preparation of photoalignment layer 502, a layer of optically anisotropic molecules is applied onto photoalignment layer 502 forming helical structures 503. The cycloidal pattern of photoalignment layer 502 defines the orientation of helical structures 503. After formation of helical structures 503, the layer of optically anisotropic molecules is firmed (e.g., fixed, set, or cured) to form a polymer. In some embodiments, the firming includes thermal or UV curing. In some embodiments, helical structures 503 are formed of liquid crystals, such as cholesteric liquid crystals. Helical structures 503 are aligned along helical axes 504 which is substantially parallel to the z-axis (e.g., helical axes 504 and the z-axis form an angle that is no greater than 20 degrees). In some embodiments, the optically anisotropic molecules are rotated in a same rotational direction (forming a helical twist) about helical axes 504 throughout the optically transparent substrate. Helical structures 503 define helical pitch 505, used herein to refer to a distance between two adjacent optically anisotropic molecules of a same helical structure that have the same orientation.

PVH optical element 500 may change or affect the direction and/or polarization of light in a certain spectral range (e.g., PVH optical element 500 is wavelength selective) and having a first circular polarization (e.g., PVH optical element 500 is polarization selective) that has the same handedness as the helical structures in PVH optical element 500. PVH optical element 500 does not change or affect the direction and polarization of light outside the certain spectral range and/or having a second circular polarization opposite to the handedness of the helical structures in PVH optical element 500. When first incident light having the first circular polarization and a wavelength in the certain spectral range impinges upon a surface (e.g., surface 500-1 or 500-2) of PVH optical element 500, PVH optical element 500 interacts with the first incident light and changes the direction of the first incident light (e.g., redirects, reflects, refracts, diffracts the first incident light). While interacting with the first incident light, a transmissive PVH changes the polarization of the first incident light (e.g., from RCP to LCP or vice versa), whereas a reflective PVH does not change the polarization of the first incident light (e.g., RCP light is reflected as RCP light). On the other hand, PVH optical element 500 is configured to transmit second incident light that has a wavelength outside the certain spectral range associated with PVH optical element 500 and/or having a circular polarization with handedness opposite to the helical structures in PVH optical element 500 without changing its direction or polarization. For example, a transmitting PVH changes polarization of first incident light from RCP light to LCP light and simultaneously changes the direction of the first incident light while transmitting the second incident light (LCP) without changing its polarization or direction. As another example, a reflective PVH lens changes the direction of the first incident light (RCP) without changing its polarization while transmitting second incident light (LCP) without changing its direction or polarization. In contrast, a conventional reflective lens or a mirror changes the polarization of polarized incident light when reflecting the light. In some embodiments, in addition to being selective based on the circular polarization of light, a PVH lens is also wavelength selective and/or selective based on incident angle of the light. Optical properties of PVH optical element 500 (e.g., reflective or transmissive) are based on an orientation of the helical axes and/or a helical pitch of a liquid crystal.

FIG. 5C is a cross-sectional view of an x-y plane of PVH optical element 500. The helical structures 503 in PVH optical element 500 form lateral fringes (e.g., lateral fringes 510-1 and 510-2) that correspond to adjacent optically anisotropic molecules in the x-y plane that have the same alignment. A lateral pitch 506 is defined by the distance between two adjacent lateral fringes (e.g., lateral fringes 510-1 and 510-2).

FIG. 5D is a cross-sectional view of a x-z plane of PVH optical element 500 across reference plane AA' illustrated in FIG. 5C. The helical structures 503 in PVH optical element 500 form helical fringes (e.g., helical fringes 512-1 and 512-2) that correspond to adjacent optically anisotropic molecules in the x-z plane that have the same alignment. The helical pitch 505 is defined by the distance between two adjacent helical fringes (e.g., helical fringes 512-1 and 512-2). In some embodiments, as shown, the helical fringes are tilted at an angle α with respect to a surface (e.g., surface 500-1 and 500-2) of PVH optical element 500.

FIG. 5E illustrates an exemplary example of the orientation of optically anisotropic molecules on a photoalignment layer (e.g., photoalignment layer 502). FIG. 5E shows two adjacent optically anisotropic molecules that have the same orientation (e.g., optically anisotropic molecules 520-1 and 520-2). The distance between optically anisotropic molecules 520-1 and 520-2 define the lateral pitch 506, also shown in FIG. 5C.

Figure 5F:
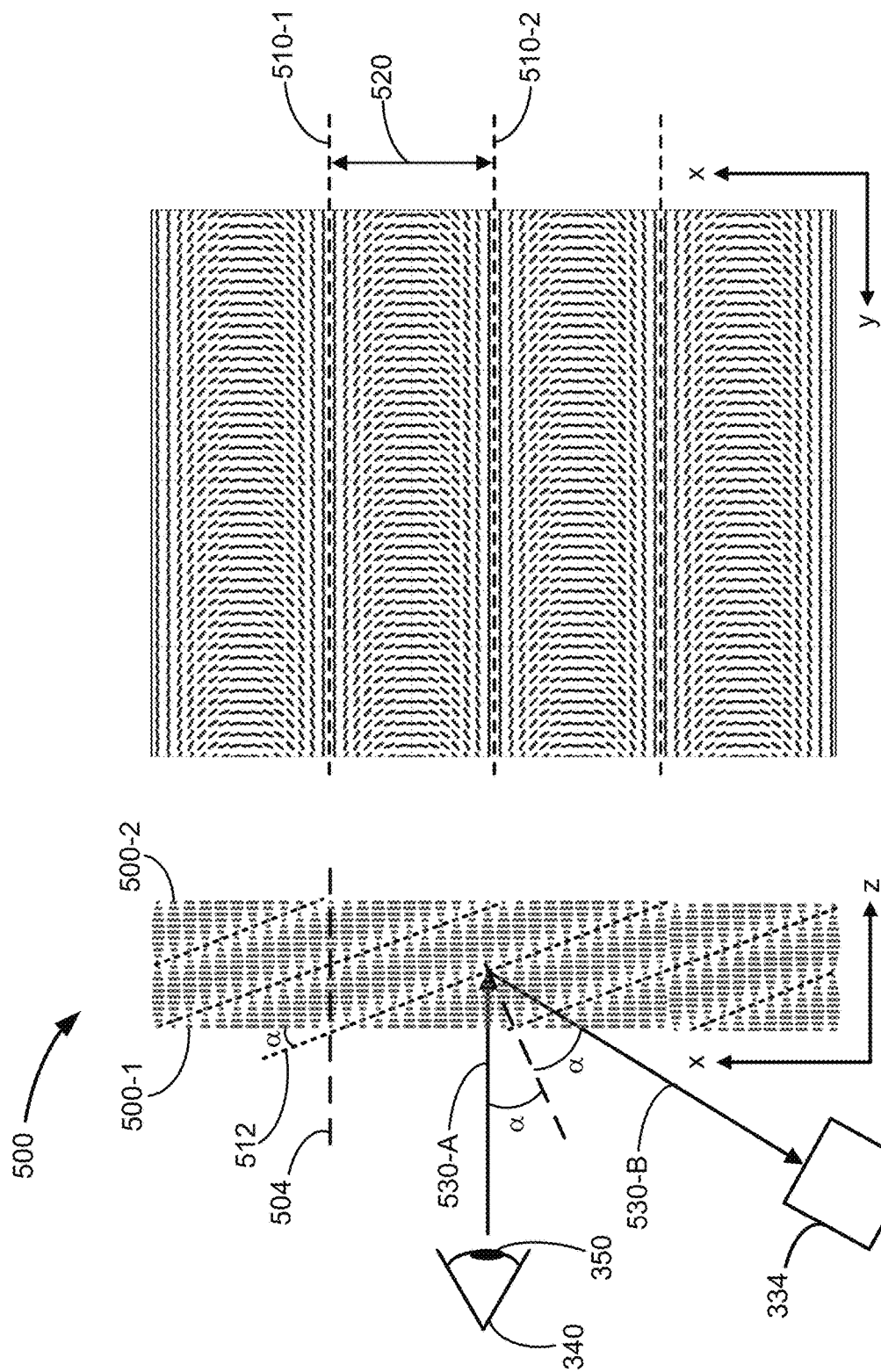
FIGS. 5F-5G illustrate exemplary examples of a polarization volume hologram in an eye-tracking assembly in accordance with some embodiments.
Figure 5G:
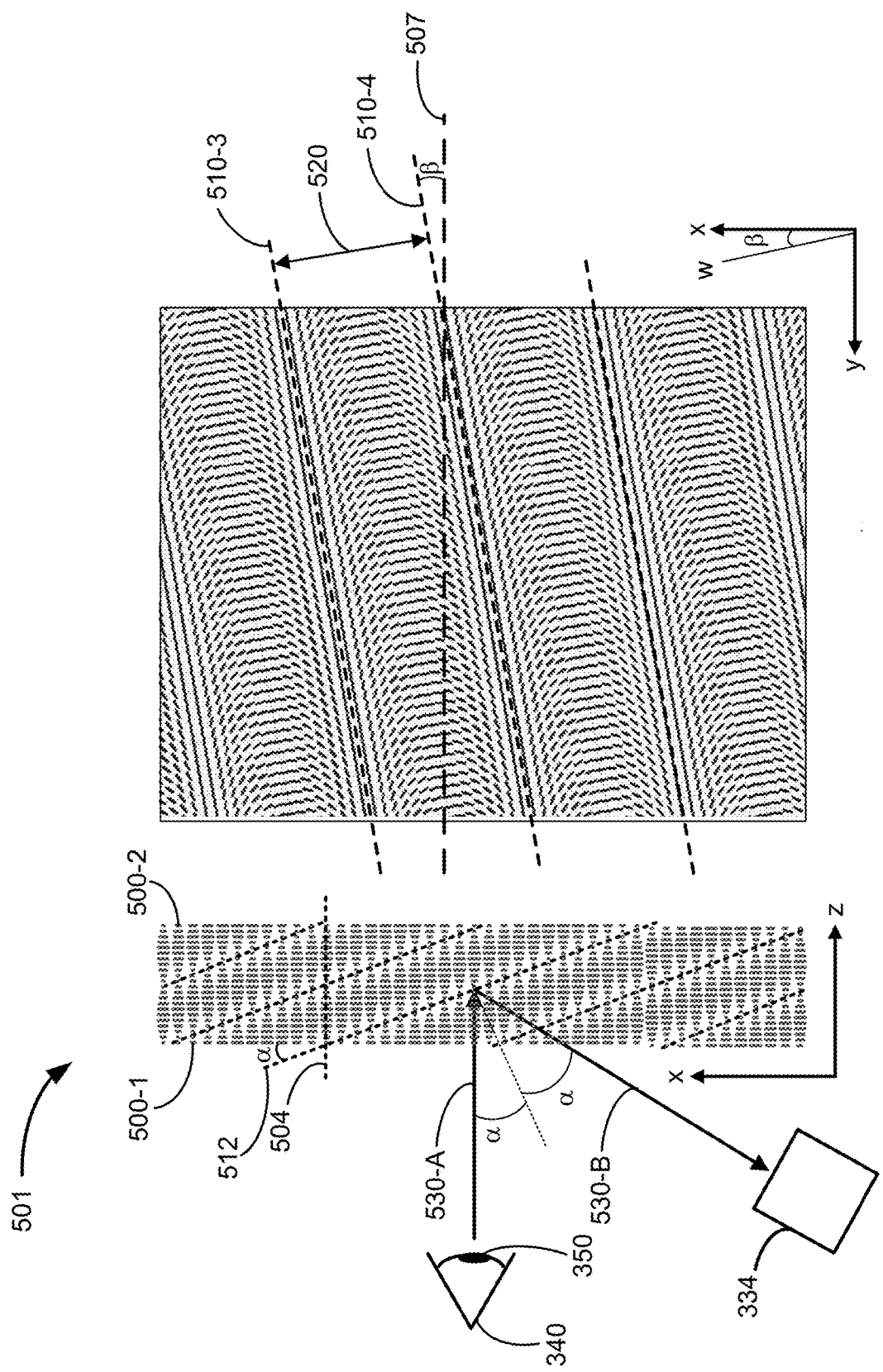

FIGS. 5F-5G illustrate exemplary examples of a polarization volume hologram in an eye-tracking assembly in accordance with some embodiments.

FIG. 5F illustrates PVH optical element 500, in an eye-tracking assembly, configured to receive light reflected off the eye 340, which may include, for example, light retro-reflected from the retina of eye 340, a cornea of eye 340, a crystalline lens of eye 340, or some combination thereof. As shown in FIG. 5F, PVH optical element 500 has tilted helical fringes 512 that form an angle α with a surface of PVH optical element 500, in this example, first surface 500-1. PVH optical element 500 also has lateral fringes 510-1 and 510-2 which are substantially perpendicular to a surface of PVH optical element 500 (e.g., helical fringe forms angle α with respect to surface 500-1 or 500-2). The lateral fringes 510-1 and 510-2 can also be thought of as being substantially parallel to the y-axis (e.g., lateral fringes 510-1 and 510-2 each form an angle less than 1 degree with the y-axis). The angle of the tilted helical fringes 510-1 and 510-2 allow PVH optical element 500 to direct light 530-A in an off-axis direction along the x-axis (e.g., left and right relative to the eye 340). For example, light 530-A incident upon PVH optical element 500 in a direction that is substantially parallel to a normal of PVH optical element 500 (e.g., substantially parallel to helical axis 504, the direction of light 530 and helical axis 504 form an angle less than 20 degrees) is redirected toward detector 334 in an off-axis direction as light 530-B. As shown in FIG. 5F, light 530-A is redirected as light 530-B such that light 530-B forms an angle 2α with light 530-A. In this example, the helical fringes 512 allow light 530-A to be redirected to the left or right of the eye 340, along the x-axis.

FIG. 5G illustrates PVH optical element 501, in an eye-tracking assembly, configured to receive light 530-A reflected off the eye 340, which may include, for example, light retro-reflected from the retina of eye 340, a cornea of eye 340, a crystalline lens of eye 340, or some combination thereof. The function of tilted helical fringes 512 in PVH optical element 501 is the same as the function of tilted helical fringes 510 in PVH optical element 500 and is not repeated here for brevity. In contrast to the lateral fringes 510-1 and 510-2 of PVH optical element 500 shown in FIG. 5F, lateral fringes 510-3 and 510-4 of PVH optical element 501 are tilted to form an angle β to a normal 507 of an edge of PVH optical element 501 that is parallel to the y-axis. The tilt in the lateral fringes 510-3 and 510-4 of PVH optical element 501 allow PVH optical element 501 to direct light 530-A in an off-axis direction along the y-axis (e.g., up and down relative to the eye 340). For example, light 530 incident upon PVH optical element 501 in a direction that is substantially parallel to a normal of PVH optical element 501 (e.g., substantially parallel to helical axis 504 the direction of light 530 and helical axis 504 form an angle that is no greater than 20 degrees) is redirected toward detector 334 in above or below the eye 340, along the y-axis. The combined function of tilted lateral fringes 510-3 and 510-4 and tilted helical fringes 512 allows PVH optical element 501 to redirect light 530-A as light 530-B directed towards detector 334 that is located off-axis with respect to one or more of the x-axis and the y-axis.

In some embodiments, the first optical element (e.g., first optical element 332) includes a first surface (e.g., surface 332-1) on the first side, a second surface (e.g., surface 332-2) on the second side, and photosensitive molecules (e.g., liquid crystals, optically anisotropic molecules 520-1 and 520-2) between the first side and the second side. The photosensitive molecules are arranged in a plurality of helical structures (e.g., helical structure 503). Each helical structure of the plurality of helical structures has a helical axis (e.g., helical axis 504). The helical axes of the plurality of helical structures are parallel with each other and the helical structures correspond to (e.g., have the same handedness as) the first circular polarization. In some embodiments, the first optical element includes an optically transparent substrate. In some embodiments, the first optical element includes a photoalignment layer (e.g., photoalignment layer 502). In some embodiments, the first optical element does not include a photoalignment layer. In some embodiments, the photosensitive molecules (e.g., liquid crystals) have a chiral structure. In some embodiments, the photosensitive molecules (e.g., liquid crystals, optically anisotropic molecules 520-1 and 520-2) have a chirality that corresponds to (e.g., has the same handedness as) the first circular polarization.

In some embodiments, the photosensitive molecules (e.g., liquid crystals, optically anisotropic molecules 520-1 and 520-2) along each helical axis (e.g., helical axis 504) form a helical structure (e.g., helical structure 503) that extends from the first side of the first optical element (e.g., first optical element 332) to the second side of the first optical element. The photosensitive molecules in the first optical element form refractive index planes. Each of the refractive index planes have a normal direction that is tilted at an angle (e.g., angle α) with respect to an optical axis of the first optical element, enabling the first optical element to redirect the first portion of the first light toward the detector (e.g., detector 334).

In accordance with some embodiments, a head-mounted device configured to mount near the eye (e.g., eye 340) of a user includes a display system (e.g., display 310) and an eye-tracker (e.g., eye-tracking assembly 330, 400, 401, 402). The display system (e.g., display 310) is configured to output image light (e.g., light 380-A) corresponding to one or more images and to project the image light toward the eye. The eye-tracker includes a detector (e.g., detector 334) and one or more optical elements (e.g., first optical element 332, second optical element 333). An optical element (e.g., first optical element 332) of the one or more optical elements has a first side face the detector and an opposing second side. The optical element is configured to receive first light reflected off the eye (e.g., light 382-A, light 384-E, light 410-A) and to redirect a first portion (e.g., light 382-B, light 384-F) of the first light toward the detector. The first portion of the first light having a first wavelength (e.g., wavelength $\lambda_1$) on a first spectral range (e.g., the certain spectral range) and first circular polarization. The optical element is also configured to transmit a second portion of the first light that is different from the first portion of the first light. The optical element is further configured to receive at least a portion of the image light on the second side, and transmit the at least a portion of the image light toward the eye of the user.

In some embodiments, the eye-tracker (e.g., eye-tracking assembly 330, 400, 401, 402) is configured to determine one or more of a position of the pupil (e.g., pupil 350) in the eye (e.g., eye 340) of the user and a gaze direction of the user. The display system (e.g., display 310) is coupled to the eye-tracker and is configured to adjust the image light (e.g., light 410) based on the position of the pupil determined by the eye-tracker.

In some embodiments, the eye tracker (e.g., eye-tracking assembly 330, 400, 401, 402) further includes a waveguide (e.g., optical waveguide 422) coupled to the first optical element (e.g., first optical element 332). The waveguide is configured to receive third light (e.g., light 484-A) from a light source and to redirect at least a portion (e.g., light 848-C) of the third light toward the eye of the user. In some embodiments, the waveguide includes a Bragg reflector configured to redirect the at least a portion of the third light. In some embodiments, the Bragg reflector is a multiplexed Bragg reflector.

In some embodiments, the first light includes fifth light reflected from a first location (e.g., pupil) of the surface of the eye and sixth light reflected from a second location (e.g., cornea) of the surface of the eye. The detector is configured to detect a first intensity of the fifth light and a second intensity of the sixth light and determine, based on the first intensity and the second intensity, the position of the pupil of the eye.

In some embodiments, the first optical element (e.g., first optical element 332, PVH optical element 500) includes a first surface (e.g., surface 332-1, surface 500-1), a second surface (e.g., surface 332-2, surface 500-2), and photosensitive molecules (e.g., liquid crystals, optically anisotropic molecules 520-1 and 520-2) are arranged in a plurality of helical structures (e.g., helical structures 503) corresponding to (e.g., having the same handedness) the first circular polarization. Each helical structure of the plurality of helical structures has a helical axis (e.g., helical axis 504) of a plurality of helical axes and each helical axis of the plurality of helical axes are aligned with each other. The photosensitive molecules have a plurality of orientations that form a pattern with fringes (e.g., lateral fringes 510-1, 510-2, 510-3, and 510-4; helical fringes 512, 512-1, and 512-2) on the first surface. Each of the fringes are formed by photosensitive molecules that have a same orientation and the fringes are shaped to enable the first optical element to direct the at least a portion of the first light toward the detector (e.g., detector 334) (e.g., the fringes are non-perpendicular and non-parallel to one of the first surface 332-1 and the second surface 332-2 of the first optical element 332).

Figure 6:
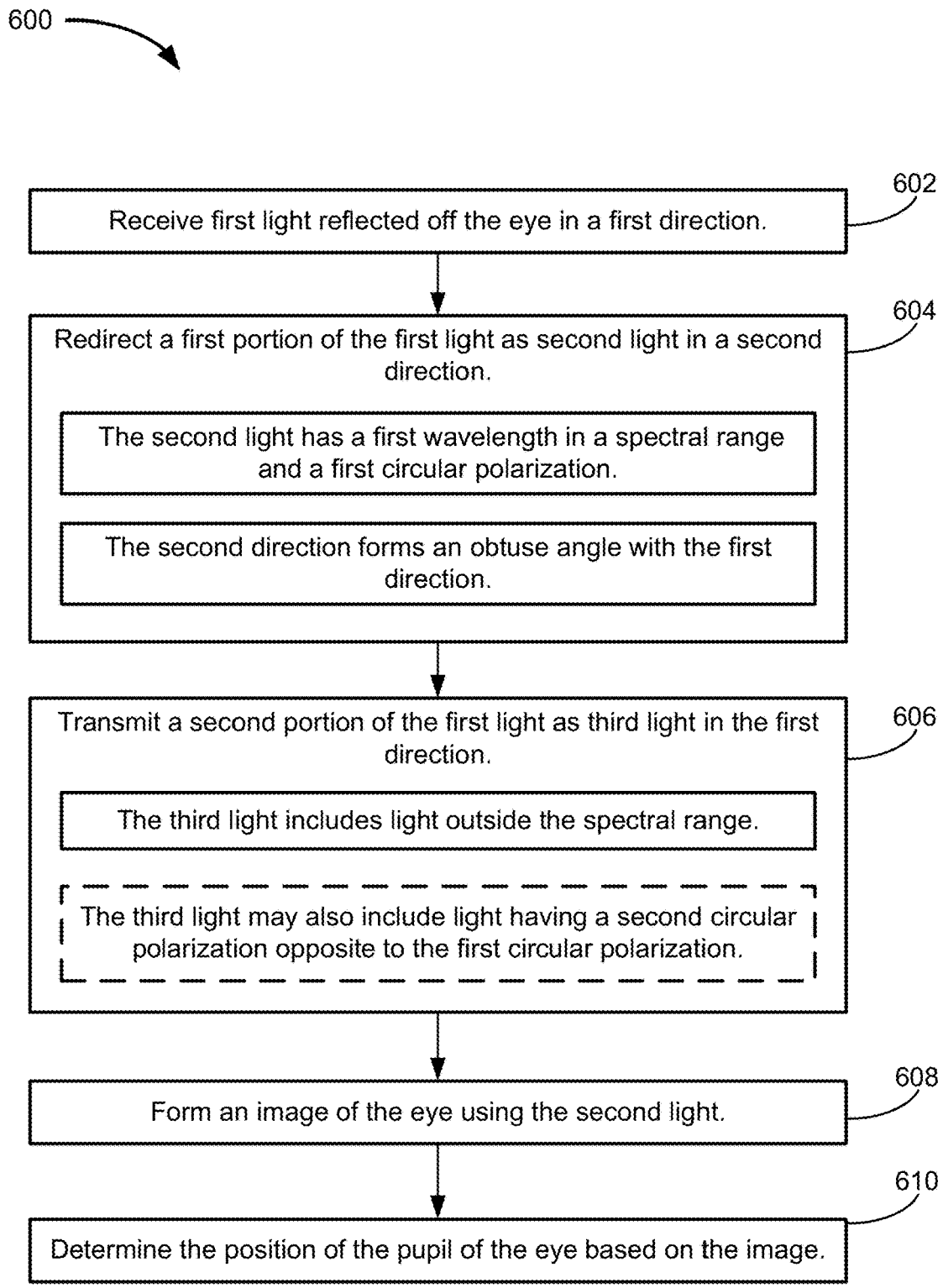
FIG. 6 illustrates a flowchart of a method of determining a position of a pupil of an eye in accordance with some embodiments.

FIG. 6 illustrates a flowchart of a method 600 of determining a position of a pupil of an eye 340 in accordance with some embodiments. Step 602 of method 600 includes receiving first light reflected off the eye in a first direction (e.g., light 382-A and/or light 410-A). Step 604 includes redirecting a first portion (e.g., 382-B) of the first light as second light in a second direction. The second light (e.g., light 382-A, light 384-E) having first wavelength (e.g., wavelength $\lambda_1$) in a spectral range (e.g., certain spectral range, IR range, near-IR range) and a first circular polarization. The second direction forming an obtuse angle (e.g., angle $\phi$) with the first direction. Step 606 includes transmitting a second portion of the first light as third light in the first direction. The third light (e.g., light 832-C, light 832-D, light 410-A, light 384-G) includes light outside the spectral range (e.g., light 410-A). In some embodiments, the third light may also include (e.g., light 832-C, light 384-G) having a second circular polarization opposite to the first circular polarization. Step 608 includes forming an image of the eye using the second light and step 610 includes determining the position of the pupil of the eye based on the image.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An eye-tracker for determining a position of a pupil of an eye, the eye-tracker comprising:
    a detector; and
    a first optical element configured to:
        receive first light reflected off the eye;
        reflectively diffract a first portion of the first light toward the detector, the first portion of the first light having a first polarization; and
        transmit second light, the second light including a second portion of the first light having a second polarization different from the first polarization.

2. The eye-tracker of claim 1, wherein:
    the detector is disposed off-axis with respect to an optical axis of the first optical element; and
    the first optical element is further configured to receive the first light in a direction that is substantially along the optical axis of the first optical element.

3. The eye-tracker of claim 1, further comprising:
    a second optical element disposed adjacent to the first optical element, the second optical element being configured to:
        receive the second portion of the first light and a third portion of the first light, wherein:
            the third portion of the first light has the first polarization;
            the first portion of the first light has wavelengths in a first wavelength range; and
            the third portion of the first light has wavelengths in a second wavelength range that is different from the first wavelength range;
        reflectively diffract the third portion of the first light toward the detector; and
        transmit the second portion of the first light.

4. The eye-tracker of claim 1, wherein the second portion of the first light includes light having the first polarization.

5. The eye-tracker of claim 1, wherein the second light further includes third light from one or more light sources and the first optical element is configured to receive the third light and to transmit the third light toward the eye.

6. The eye-tracker of claim 5, wherein:
    the one or more light sources include a display system configured to project image light corresponding to one or more images toward the eye; and
    the third light includes at least a portion of the image light.

7. The eye-tracker of claim 5, wherein the first light includes a portion of the third light that is reflected off the eye.

8. The eye-tracker of claim 5, wherein:
    the one or more light sources includes an illumination source;
    the third light includes fourth light from the illumination source; and the eye-tracker further comprises a waveguide coupled to the first optical element, wherein:
the waveguide is configured to receive the fourth light and to reflectively diffract at least a portion of the fourth light.

9. The eye-tracker of claim 8, wherein the waveguide includes a Bragg reflector configured to reflectively diffract the at least a portion of the fourth light.

10. The eye-tracker of claim 9, wherein the Bragg reflector is a multiplexed Bragg reflector.

11. The eye-tracker of claim 8, wherein the waveguide is disposed adjacent to the first optical element.

12. The eye-tracker of claim 1, wherein:
the first light includes fifth light reflected from a first location of the eye and sixth light reflected from a second location of the eye; and
the detector is configured to:
detect a first intensity of a reflected portion of the fifth light and a second intensity of a reflected portion of the sixth light; and
determine, based on the first intensity and the second intensity, the position of the pupil of the eye.

13. The eye-tracker of claim 1, wherein:
the first optical element includes photosensitive molecules arranged in a plurality of helical structures;
each helical structure of the plurality of helical structures has a helical axis;
the helical axes of the plurality of helical structures are parallel with each other; and
the helical structures correspond to the first polarization.

14. The eye-tracker of claim 13, wherein:
the photosensitive molecules along each helical axis form a helical structure; and
the photosensitive molecules in the first optical element form refractive index planes each having a normal direction that is tilted at an angle with respect to an optical axis of the first optical element, enabling the first optical element to reflectively diffract the first portion of the first light toward the detector.

15. A head-mounted device configured to mount near an eye of a user, the head-mounted device comprising:
a display system configured to output image light corresponding to one or more images and to project the image light toward the eye; and
an eye-tracker, the eye-tracker including:
a detector; and
an optical element configured to:
receive first light reflected off the eye;
reflectively diffract a first portion of the first light toward the detector, the first portion of the first light having a first polarization;
transmit second light, the second light including a second portion of the first light having a second polarization different from the first polarization; and
transmit at least a portion of the image light toward the eye of the user.

16. The head-mounted device of claim 15, wherein:
the eye-tracker is configured to determine one or more of a position of a pupil of the eye of the user and a gaze direction of the user; and
the display system is coupled to the eye-tracker and is configured to adjust the image light based on the position of the pupil determined by the eye-tracker.

17. The head-mounted device of claim 15, wherein the eye-tracker further comprises a waveguide coupled to the optical element, the waveguide is configured to receive third light from a light source and to reflectively diffract at least a portion of the third light toward the eye of the user.

18. The head-mounted device of claim 17, wherein:
the first light includes fourth light reflected from a first location of a surface of the eye and fifth light reflected from a second location of the surface of the eye; and
the detector is configured to:
detect a first intensity of the fourth light and a second intensity of the fifth light; and
determine, based on the first intensity and the second intensity, a position of a pupil of the eye.

19. The head-mounted device of claim 15, wherein:
the optical element includes a first surface, a second surface, and photosensitive molecules between the first surface and the second surface;
the photosensitive molecules are arranged in a plurality of helical structures corresponding to the first polarization;
each helical structure of the plurality of helical structures has a helical axis of a plurality of helical axes;
each helical axis of the plurality of helical axes are aligned with each other;
the photosensitive molecules have a plurality of orientations that form a pattern with fringes on the first surface;
each of the fringes are formed by photosensitive molecules that have a same orientation; and
the fringes are shaped to enable the optical element to direct the at least a portion of the first light toward the detector.

20. A method for determining a position of a pupil of an eye, the method comprising:
receiving first light reflected off the eye;
reflectively diffract a first portion of the first light having a first polarization;
transmitting a second portion of light reflected off the eye as second light, the second light including a second portion of the first light having a second polarization different from the first polarization;
forming an image of the eye using the first light; and
determining the position of the pupil of the eye based on the image.

* * * * *